(12) United States Patent
Uratani et al.

(10) Patent No.: US 7,243,196 B2
(45) Date of Patent: Jul. 10, 2007

(54) DISK ARRAY APPARATUS, AND METHOD FOR AVOIDING DATA CORRUPTION BY SIMULTANEOUS ACCESS BY LOCAL AND REMOTE HOST DEVICE

(75) Inventors: Ikuo Uratani, Kanagawa (JP); Kiichiro Urabe, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 410 days.

(21) Appl. No.: 10/769,784

(22) Filed: Feb. 3, 2004

(65) Prior Publication Data

US 2005/0120174 A1 Jun. 2, 2005

(30) Foreign Application Priority Data

Nov. 28, 2003 (JP) .............................. 2003-400549

(51) Int. Cl.
*G06G 13/00* (2006.01)
(52) U.S. Cl. .................. 711/161; 711/114; 711/150; 711/152; 711/162; 711/203
(58) Field of Classification Search ........ 711/111–112, 711/114, 147, 150, 152, 161–162, 203
See application file for complete search history.

(56) References Cited

U.S. PATENT DOCUMENTS

| | | | |
|---|---|---|---|
| 5,459,857 A | 10/1995 | Ludlam et al. | |
| 5,581,724 A | 12/1996 | Belsan et al. | |
| 5,608,891 A | 3/1997 | Mizuno et al. | |
| 5,680,640 A | 10/1997 | Ofek | |
| 5,742,792 A | 4/1998 | Yanai et al. | |
| 5,881,311 A | 3/1999 | Woods | |
| 5,896,548 A | 4/1999 | Ofek | |
| 5,930,823 A | * 7/1999 | Ito et al. ...................... 711/152 |
| 6,108,748 A | 8/2000 | Ofek | |
| 6,240,486 B1 | 5/2001 | Ofek | |
| 6,356,977 B2 | 3/2002 | Ofek | |
| 6,480,953 B1 | 11/2002 | Hughes | |
| 6,542,961 B1 | 4/2003 | Matsunami | |
| 6,557,089 B1 | 4/2003 | Reed et al. | |
| 6,598,134 B2 | 7/2003 | Ofek | |

(Continued)

FOREIGN PATENT DOCUMENTS

EP   1 310 876 A1   5/2003

(Continued)

*Primary Examiner*—Matthew Kim
*Assistant Examiner*—Hetul Patel
(74) *Attorney, Agent, or Firm*—Mattingly, Stanger, Malur & Brundidge, P.C.

(57) ABSTRACT

When copy instruction details are transferred to a first storage control unit from an application program, a channel processor captures the instruction details into local memory. Then, the instruction details are analyzed, and based on the analysis result, an open remote copy/MRCF instruction is output to an open remote copy/MRCF control section. If the instruction details have no problem, a response is made to a host unit that the writing response is normally made. To be ready for reading of inquiry information by the host unit, shared memory is searched for the inquiry information to create output data from the first storage control unit to the host unit. With such a structure, a storage device in a disk array apparatus external to another disk array apparatus can be used as resources of any device connectable to higher-level systems.

20 Claims, 19 Drawing Sheets

U.S. PATENT DOCUMENTS

| | | |
|---|---|---|
| 6,832,289 B2 | 12/2004 | Johnson et al. |
| 2001/0001870 A1 | 5/2001 | Ofek |
| 2002/0004890 A1 | 1/2002 | Ofek |
| 2002/0091898 A1 | 7/2002 | Matsunami et al. |
| 2002/0092898 A1 | 7/2002 | Proksch |
| 2002/0095549 A1 | 7/2002 | Matsunami |
| 2003/0188114 A1 | 10/2003 | Lubbers et al. |
| 2004/0049643 A1 | 3/2004 | Alavarez et al. |
| 2005/0160176 A1* | 7/2005 | Seales et al. ............... 709/229 |

FOREIGN PATENT DOCUMENTS

| | | |
|---|---|---|
| EP | 1 357 476 A2 | 10/2003 |
| JP | 09-288547 | 11/1997 |
| JP | 10-508967 | 9/1998 |
| JP | 2001-337850 | 12/2001 |

* cited by examiner

| VDEV | EXTERNAL DEVICE INFORMATION | | | PATH INFORMATION | |
| --- | --- | --- | --- | --- | --- |
| | DEVICE IDENTIFYING INFORMATION | CAPACITY (KB) | DEVICE TYPE | WWN | LUN |
| 0 | DRFGTFNEIEK | 657,456 | DISK | 0xAABBCCDD | 0 |
| 1 | ADRFGTFNEIE | 89,854 | DISK | 0xAABBEEFF | 3 |
| 2 | GGRRFFDDERT | — | TAPE | 0x445566AAB | 5 |
| 3 | AABBCCDDEE | 5,544,223 | DISK | 0x77DE12345 | 6 |
| | | | | 0x77DE12345 | 3 |
| | | | | 0x377DE7890 | 5 |

The last three rows' WWN/LUN entries (0x77DE12345/6, 0x77DE12345/3, 0x377DE7890/5) are braced as ALTERNATE PATH.

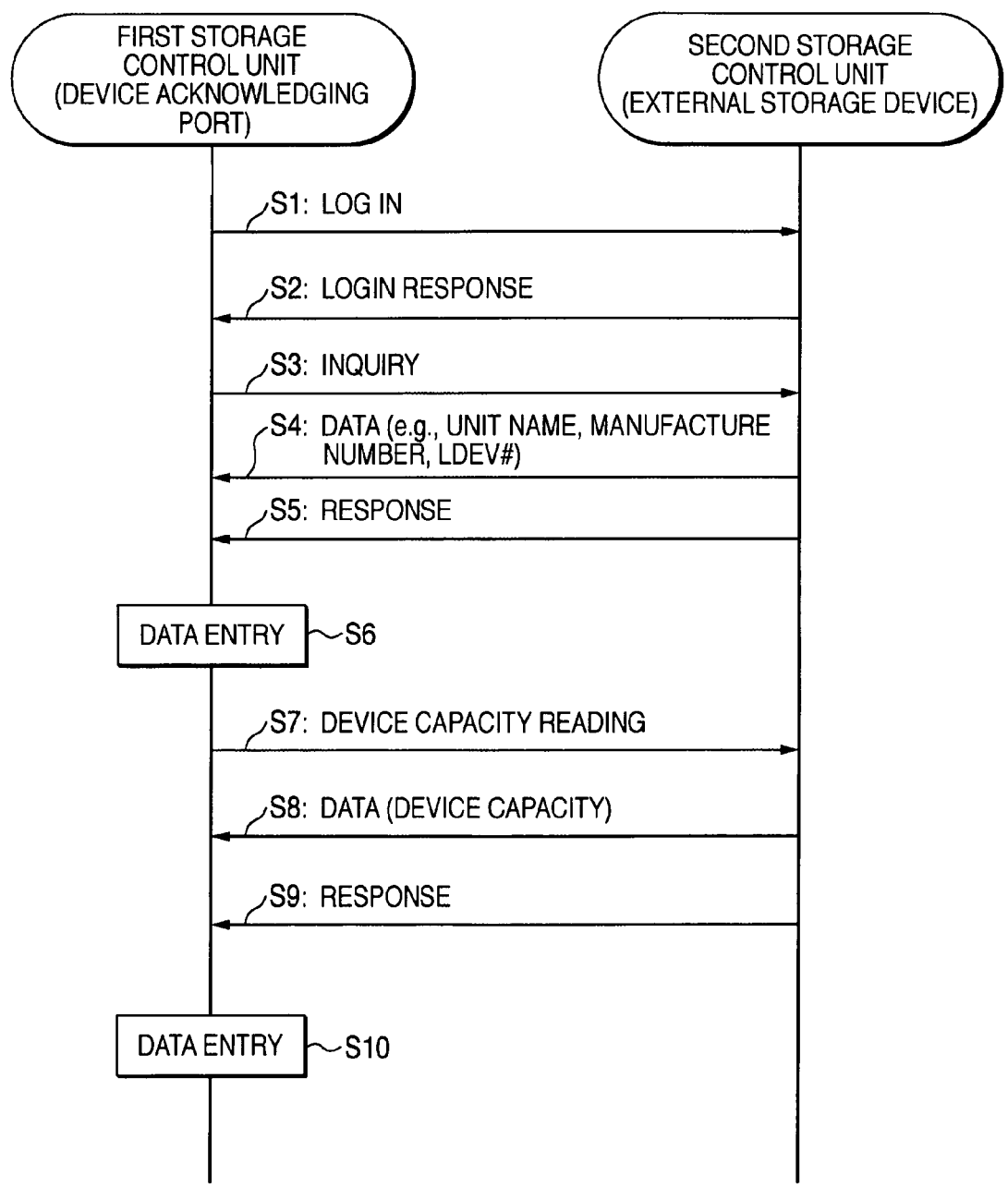

FIG. 7A

LUN# + LBA → T1

| LUN# | LDEV # | LDEV MAXIMUM SLOT NUMBER | VDEV # | VDEV MAXIMUM SLOT NUMBER |
|---|---|---|---|---|
| 0 | 3 | 10000 | 1 | 50000 |
| 1 | 1 | 40000 | | |
| 2 | 4 | 50000 | 4 | 50000 |

↓

VDEV# + SLOT# + SUB BLOCK#

| VDEV# | INITIATOR PORT | WWN | LUN |
|---|---|---|---|
| 1 | 1 | 0x00112233ANBCD | 0 |
| | 4 | 0x001122334455678 | 0 |
| | 3 | 0x001122337788990 | 4 |
| 4 | 1 | 0x001122335566778 | 1 |

↓

INITIATOR PORT# + WWN + LUN# + LBA

| VDEV# | STRIPE SIZE | RAID LEVEL | COMPETITORS' SS# | VDEV-EXTERNAL LUN PATH | | |
|---|---|---|---|---|---|---|
| | | | | INITIATOR PORT# | WWN | LUN |
| 1 | 64BYTE | RAID1 | 1 | 1 | 0x00112233ANBCD | 0 |
| | | | | 4 | 0x001122334455678 | 0 |
| | | | | 3 | 0x001122337788990 | 4 |
| | | | 4 | 1 | 0x001122334455678 | 1 |
| | | | 6 | 3 | 0x001122337788990 | 2 |
| | | | 7 | 3 | 0x001122334455678 | 5 |

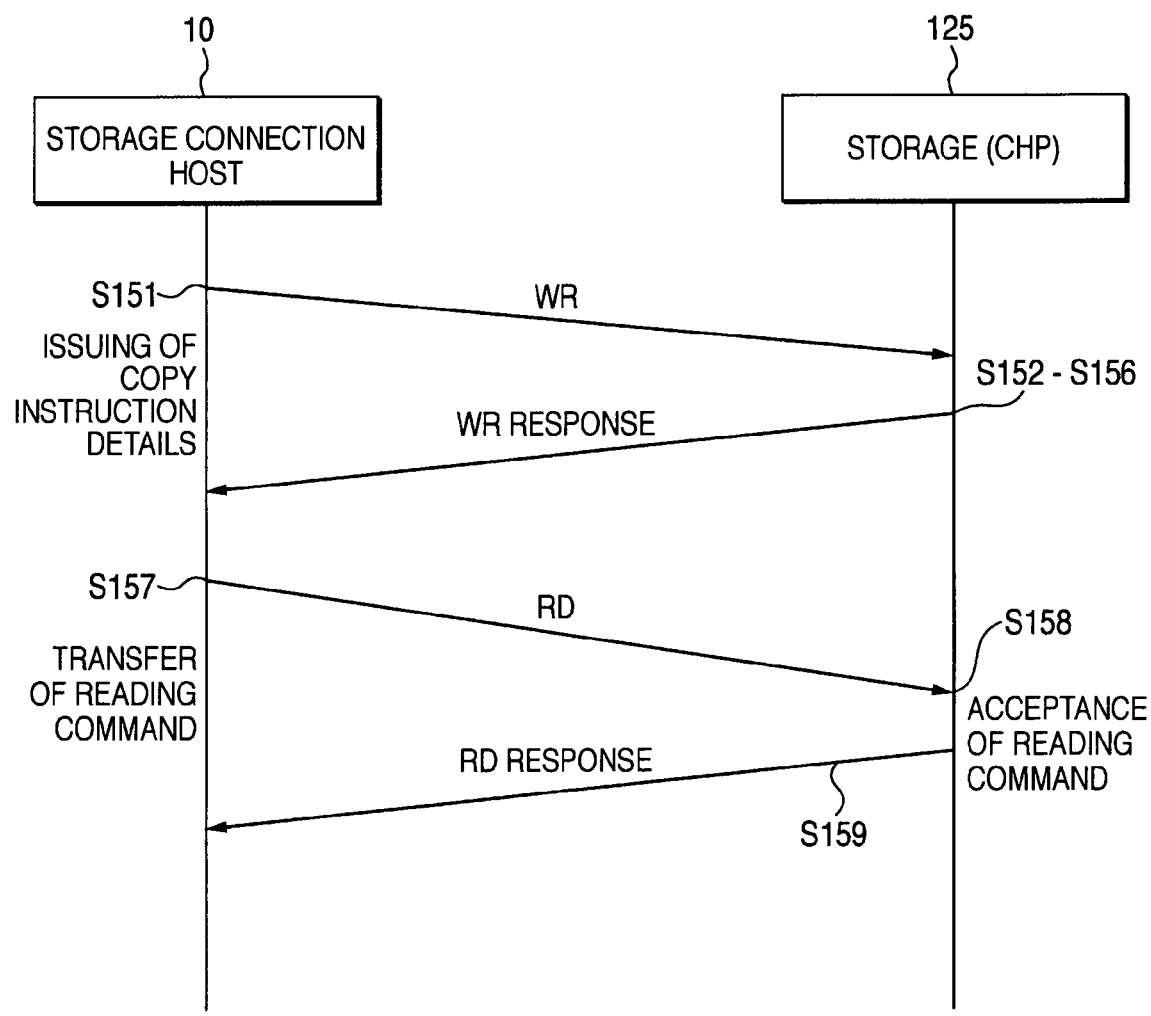

FIG. 13B

| VDEV | EXTERNAL DEVICE INFORMATION | | | | |
| --- | --- | --- | --- | --- | --- |
| | DEVICE IDENTIFYING INFORMATION (ID) | CAPACITY (K BYTE) | DEVICE TYPE | PATH INFORMATION | |
| | | | | WWN | LUX |
| 0 | DRFGTFNEIEK WNF1GKEF | 657,456 | DISK | 0xAABBCCDD EEFF0000 | 0 |
| 1 | ADRFGTFNEIE KWN33445 | 89,354 | DISK | 0xAABBCCD DEEFF0000 | 3 |
| 2 | GGRRFFDDER TT00 | — | TAPE | 0x44556677 AA331122 | 5 |
| 3 | AABBCCDD EEFF | 5,544,223 | DISK | 0x77DE12435 5889922 | 6 |
| | | | | 0x77DE12435 588910 | 3 |
| | | | | 0x77DE12435 588988 | 5 |

FIG. 13C

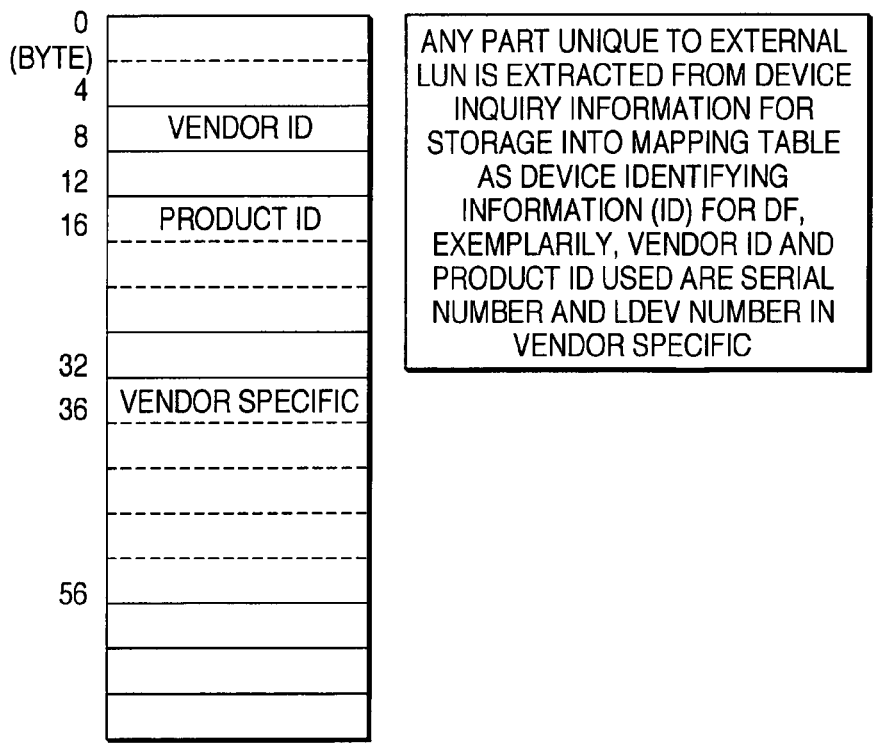

ANY PART UNIQUE TO EXTERNAL LUN IS EXTRACTED FROM DEVICE INQUIRY INFORMATION FOR STORAGE INTO MAPPING TABLE AS DEVICE IDENTIFYING INFORMATION (ID) FOR DF, EXEMPLARILY, VENDOR ID AND PRODUCT ID USED ARE SERIAL NUMBER AND LDEV NUMBER IN VENDOR SPECIFIC

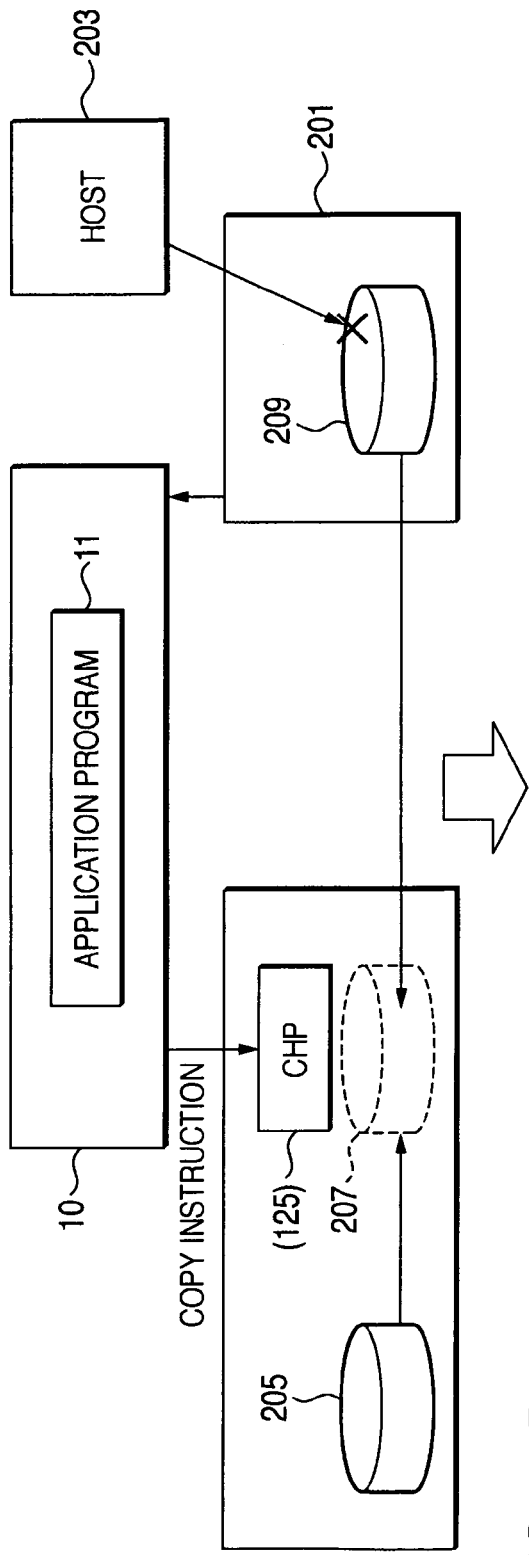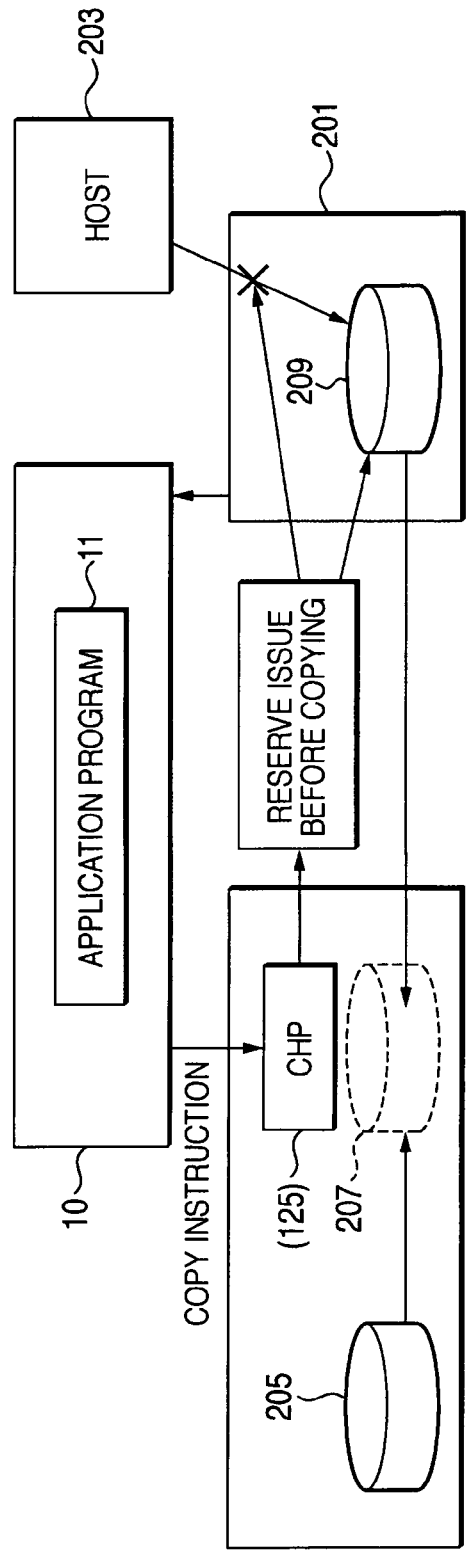

DISK ARRAY APPARATUS, AND METHOD FOR AVOIDING DATA CORRUPTION BY SIMULTANEOUS ACCESS BY LOCAL AND REMOTE HOST DEVICE

CROSS-REFERENCES TO RELATED APPLICATIONS

This application relates to and claims priority from Japanese Patent Application No. 2003-400549, filed on Nov. 28, 2003, the entire disclosure of which is incorporated herein by reference.

BACKGROUND OF THE INVENTION

The present invention relates to a disk array apparatus provided, through communicable connection with a host computer and/or another disk array apparatus not allowed for direct connection with the host computer, for storage of data coming from the host computer into a storage region derived by adding together a storage region of another disk array apparatus and a storage region of the disk array apparatus, and a control method for such a disk array apparatus. In the below, the disk array apparatus is referred to as storage control unit.

In database systems such as data centers and others handling large data, data management is performed using a storage system that is separately provided from a host computer (in the below, referred to as "host unit"). The storage system is exemplified for a disk array apparatus, in which a plurality of storage devices are arranged in an array. The disk array apparatus is configured based on RAID (Redundant Array of Independent Inexpensive Disks), for example. A set of such storage devices provides a physical storage region formed with at least one or more logical volumes (logical units) The logical volume is made available to the host unit, more specifically, to a data base program operating on the host unit (hereinafter, referred also to as "application program"). Through transmission of a predetermined command, the host unit can perform data writing/reading to/from the logical volumes.

In the rapidly advancing information society, data volume is increasing on a daily basis for database management. Such a data increase is fueling demand for a larger-capacity, higher-performance storage control unit, and to meet such a market demand, there have been developed storage control units of an advanced type. Installation of the advanced-type storage control unit into the storage system may be done in two manners: one is the manner of totally replacing a previous-type unit(s) with an advanced-type unit(s), and thereby, configuring the storage system from the beginning (JP-A-10-508967). The other is the manner of newly adding an advanced-type unit(s) to the storage system configured only by a previous-type unit(s) to use both types therein.

Also known is a technology of dynamically configuring a logical device on a sector basis through management of storage region of a physical device also on a sector basis (JP-A-2001-337850).

To configure a logical device from a plurality of storage devices varying in capacity, applied is a technology of using the storage device having the smallest capacity as a reference for area formation to other remaining storage devices (JP-A-9-288547).

The issue here is that the data communications performance becomes sometimes poor between a host unit and a storage control unit provided externally thereto. This is caused due to poor connection therebetween specifically when an application program on the host unit makes an attempt to acquire inquiry information from the external storage control unit. Further, at the time of acquisition of the inquiry information, such a connection failure between the host unit and the external storage control unit may prevent the application program from supporting the inquiry information in the external storage control unit.

Similarly, when (an application program of) a host unit and (that of) another host unit provided externally to an internal storage control unit connected to the host unit make an attempt to acquire inquiry information from an external storage control unit, the external storage control unit may be structurally incapable of responding to a (remote copy) command coming from the external host unit.

There may be a case where an internal storage control unit performs a remote copy following a copy command issued thereto from (an application program of) a host unit. The remote copy may be made from a storage device of a remote-copy-incapable external storage control unit to a virtual device provided in the internal storage control unit. There may also be a case, together with such a remote copy, where the internal storage control unit performs copy from its storage device to a virtual device. During such copy, if the directly-connected external host unit makes access to the external storage control unit, the copy details are disadvantageously corrupted thereby. This is because the external storage control unit is not able to reject access from the external host unit in such a case.

SUMMARY OF THE INVENTION

In consideration of the above, a first object of the present invention is to use, as resources of any devices connectable to higher-level systems, storage devices of an external disk array apparatus being externally-existing device resources.

A second object of the present invention is to allow an application program on an external host unit to acquire inquiry information from an external disk array apparatus that is not equipped for a (remote copy) command from the external host unit via another command-ready external disk array apparatus.

Further, a third object of the present invention is to allow an external disk array apparatus to reject access from an external host unit directly connected thereto while a certain disk array apparatus is executing a copy from the external disk array apparatus.

A first aspect of the present invention is directed to a disk array apparatus communicably connected to a host computer and/or the other disk array apparatus incapable of establishing a direct connection with the host computer in which data coming from the host computer is stored in a storage region as a result of addition of a storage region of the other disk array apparatus to a storage region of the disk array apparatus. The disk array apparatus includes: a logical unit formation section for forming a plurality of logical units from the storage region of the addition result to be accessed by the host computer; a data writing section for writing, to each of the logical units, data coming from the host computer and/or the other disk array apparatus; a first check section for checking a validity of a reading request coming from the host computer for reading the data stored in the disk array apparatus and/or the other disk array apparatus; a data transfer section for, when the first check section determines that the data reading request is valid, transferring the data stored in each of the logical units to the host computer based on the data reading request; a second check section for checking a validity of an instruction coming from the host computer for forming a pair between, out of a plurality of logical units, the logical unit formed from the storage region of the disk array apparatus and the logical unit formed from the storage region of the other disk array apparatus; a pair formation section for forming the pair when the second check section determines that the instruction from the host computer is valid as a result of instruction result; and a copy section for, when the logical unit formed from the storage region of the disk array apparatus is accessed by the host computer for writing, copying writing data to the other logical unit forming the pair with the logical unit. Utilizing the interrelation between information about a plurality of logical units and information about the storage region as the addition result, the copy section copies the writing data to any actual storage region of the other disk array apparatus.

In a preferred embodiment according to the first aspect of the present invention, the data reading request includes a command for the disk array apparatus to acquire the data stored in the other disk array apparatus, and based on the command, another command for the disk array apparatus to transfer the acquired data to the host computer.

In another preferred embodiment, the first check section checks the validity of both the command for the data acquisition and the command for the data transfer to the host computer.

In still another preferred embodiment, when the first check section determines that neither or either of the commands is valid as a result of command check, a report indicative of error is made to the host computer.

In still another preferred embodiment, a data creation section is further included for, when the first check section determines that the command for the data acquisition is valid, creating data based on the command for transfer to the host computer.

In still another preferred embodiment, the data transfer section transfers the data created by the data creation section after checking that the host computer is a sender of the data reading request.

Further, in still another preferred embodiment, the data writing section writes the data transferred from the other disk array apparatus to the disk array apparatus through mapping to the storage region of the disk array apparatus being a virtual device connected to the logical units.

A second aspect of the present invention is directed to a disk array apparatus communicably connected to a host computer and/or the other disk array apparatus incapable of establishing a direct connection with the host computer in which data coming from the host computer is stored in a storage region as a result of addition of a storage region of the other disk array apparatus to a storage region of the disk array apparatus. The disk array apparatus includes: a logical unit formation section for forming a plurality of logical units from the storage region of the addition result to be accessed by the host computer; a mapping table retention section at least including identifying information for a virtual device derived by virtualizing the storage region of the disk array apparatus, and retaining a mapping table showing an interrelation between the virtual device and the storage region of the other disk array apparatus mapped to the virtual device; a search section for, when a data reading request including at least the identifying information for the virtual device comes from the host computer, searching the mapping table for a target virtual device based on the identifying information; a data transfer section for reading data from the virtual device found by the search section for transfer to the host computer; a check section for checking a validity of an instruction coming from the host computer for forming a pair between, out of a plurality of logical units, the logical unit formed from the storage region of the disk array apparatus and the logical unit formed from the storage region of the other disk array apparatus; a pair formation section for forming the pair when the check section determines that the instruction from the host unit is valid as a result of instruction check; and a copy section for, when the logical unit formed from the storage region of the disk array apparatus is accessed by the host computer for writing, copying writing data to the other logical unit forming the pair with the logical unit. Utilizing the interrelation between information about a plurality of logical units and information about the storage region as the addition result, the copy section copies the writing data to any actual storage region of the other disk array apparatus.

In a preferred embodiment according to the second aspect of the present invention, to the virtual device, data of another storage region of the disk array apparatus is also copied, and the data reading request from the host computer includes identifying information for the other storage region.

In another preferred embodiment, the data transferred by the data transfer section from the disk array apparatus to the host computer is further transferred from the host computer to another host computer that is never directly connected to the disk array apparatus.

A third aspect of the present invention is directed to a disk array apparatus communicably connected to a host computer and/or the other disk array apparatus incapable of establishing a direct connection with the host computer in which data coming from the host computer is stored in a storage region as a result of addition of a storage region of the other disk array apparatus to a storage region of the disk array apparatus. The disk array apparatus includes: a logical unit formation section for forming a plurality of logical units from the storage region of the addition result to be accessed by the host computer; a data writing section for writing, to each of the logical units, data coming from the host computer and/or the other disk array apparatus; a check section for checking a validity of an instruction coming from the host computer for forming a pair between, out of a plurality of logical units, the logical unit formed from the storage region of the disk array apparatus and the logical unit formed from the storage region of the other disk array apparatus; a pair formation section for forming the pair when the check section determines that the instruction from the host unit is valid as a result of instruction check; and a copy section for, when the logical unit formed from the storage region of the disk array apparatus is accessed by the host computer for writing, copying writing data to the other logical unit forming the pair with the logical unit. Utilizing the interrelation between information about a plurality of logical units and information about the storage region as the addition result, the copy section copies the writing data to any actual storage region of the other disk array apparatus.

In a preferred embodiment according to the third aspect of the present invention, when the check section determines that the pair formation instruction is not valid as a result of instruction check, a report indicative of error is made to the host computer.

In another preferred embodiment, when the pair formation section determines that a problem occurs in a process of the pair formation, a report indicative of error is made to the host computer.

A fourth aspect of the present invention is directed to a disk array apparatus communicably connected to a first host computer and/or the other disk array apparatus connected to a second host computer in which data coming from the first host computer is stored in a storage region as a result of addition of a storage region of the other disk array apparatus to a storage region of the disk array apparatus. The disk array apparatus includes: a logical unit formation section for forming a plurality of logical units from the storage region of the addition result to be accessed by the host computer; a data writing section for writing, to each of the logical units, data coming from the first host computer and/or the other disk array apparatus; a check section for checking a validity of an instruction coming from the first host computer for forming a pair between, out of a plurality of logical units, the logical unit formed from the storage region of the disk array apparatus and the logical unit formed from the storage region of the other disk array apparatus; a pair formation section for forming the pair when the check section determines that the instruction from the first host computer is valid as a result of instruction check; a copy section for, when the logical unit formed from the storage region of the disk array apparatus is accessed by the first host computer for writing, copying writing data to the other logical unit forming the pair with the logical unit; and a prohibition section for, when a reading request comes from the second host computer for the data stored in the disk array apparatus and/or the other disk array apparatus, prohibiting the second host computer to make an access to the other disk array apparatus until a process ends after started responding to the data reading request. Utilizing the interrelation between information about a plurality of logical units and information about the storage region as the addition result, the copy section copies the writing data to any actual storage region of the other disk array apparatus.

In a preferred embodiment according to the fourth aspect of the present invention, the access prohibition is issuing of a reserve command by the prohibition section to the other disk array apparatus to protect the data of the other disk array apparatus from the access by the second host computer thereto.

In another preferred embodiment, to the virtual device, data of the other storage region of the disk array apparatus is also copied.

A fifth aspect of the present invention is directed to a control method of a disk array apparatus communicably connected to a host computer and/or the other disk array apparatus incapable of establishing a direct connection with the host computer in which data coming from the host computer is stored in a storage region as a result of addition of a storage region of the other disk array apparatus to a storage region of the disk array apparatus. The control method includes: a logical unit formation step of forming a plurality of logical units from the storage region of the addition result to be accessed by the host computer; a data writing step of writing, to each of the logical units, data coming from the host computer and/or the other disk array apparatus; a first check step of checking a validity of a reading request coming from the host computer for reading the data stored in the disk array apparatus and/or the other disk array apparatus; a data transfer step of, when the first check step determines that the data reading request is valid, transferring the data stored in each of the logical units to the host computer based on the data reading request; a second check step of checking a validity of an instruction coming from the host computer for forming a pair between, out of a plurality of logical units, the logical unit formed from the storage region of the disk array apparatus and the logical unit formed from the storage region of the other disk array apparatus; a pair formation step of forming the pair when the second check step determines that the instruction from the host computer is valid as a result of instruction check; and a writing data copy step of, when the logical unit formed from the storage region of the disk array apparatus is accessed by the host computer for writing, copying writing data to the other logical unit forming the pair with the logical unit. Utilizing the interrelation between information about a plurality of logical units and information about the storage region as the addition result, the writing data copy step copies the writing data to any actual storage region of the other disk array apparatus.

A sixth aspect of the present invention is directed to a control method of a disk array apparatus communicably connected to a host computer and/or the other disk array apparatus incapable of establishing a direct connection with the host computer in which data coming from the host computer is stored in a storage region as a result of addition of a storage region of the other disk array apparatus to a storage region of the disk array apparatus. The control method includes: a logical unit formation step of forming a plurality of logical units from the storage region of the addition result to be accessed by the host computer; a mapping table retention step at least including identifying information for a virtual device derived by virtualizing the storage region of the disk array apparatus, and retaining a mapping table showing an interrelation between the virtual device and the storage region of the other disk array apparatus mapped to the virtual device; a search step of, when a data reading request including at least the identifying information for the virtual device comes from the host computer, searching the mapping table for a target virtual device based on the identifying information; a data transfer step of reading data from the virtual device found by the search step for transfer to the host computer; a check step of checking a validity of an instruction coming from the host computer for forming a pair between, out of a plurality of logical units, the logical unit formed from the storage region of the disk array apparatus and the logical unit formed from the storage region of the other disk array apparatus; a pair formation step of forming the pair when the check step determines that the instruction from the host computer is valid as a result of instruction check; and a writing data copy step of, when the logical unit formed from the storage region of the disk array apparatus is accessed by the host computer for writing, copying writing data to the other logical unit forming the pair with the logical unit. Utilizing the interrelation between information about a plurality of logical units and information about the storage region as the addition result, the writing data copy step copies the writing data to any actual storage region of the other disk array apparatus.

A seventh aspect of the present invention is directed to a control method of a disk array apparatus communicably connected to a host computer and/or the other disk array apparatus incapable of establishing a direct connection with the host computer in which data coming from the host computer is stored in a storage region as a result of addition of a storage region of the other disk array apparatus to a storage region of the disk array apparatus. The control method includes: a logical unit formation step of forming a plurality of logical units from the storage region of the addition result to be accessed by the host computer; a data writing step of writing, to each of the logical units, data coming from the host computer and/or the other disk array apparatus; a check step of checking a validity of an instruction coming from the host computer for forming a pair between, out of a plurality of logical units, the logical unit formed from the storage region of the disk array apparatus and the logical unit formed from the storage region of the other disk array apparatus; a pair formation step of forming the pair when the check step determines that the instruction from the host unit is valid as a result of instruction check; and a writing data copy step of, when the logical unit formed from the storage region of the disk array apparatus is accessed by the host computer for writing, copying writing data to the other logical unit forming the pair with the logical unit. Utilizing the interrelation between information about a plurality of logical units and information about the storage region as the addition result, the writing data copy step copies the writing data to any actual storage region of the other disk array apparatus.

An eighth aspect of the present invention is directed to a control method of a disk array apparatus communicably connected to a first host computer and/or the other disk array apparatus connected to a second host computer in which data coming from the host computer is stored in a storage region as a result of addition of a storage region of the other disk array apparatus to a storage region of the disk array apparatus. The control method includes: a logical unit formation step of forming a plurality of logical units from the storage region of the addition result to be accessed by the host computer; a data writing step of writing, to each of the logical units, data coming from the first host computer and/or the other disk array apparatus; a check step of checking a validity of an instruction coming from the first host computer for forming a pair between, out of a plurality of logical units, the logical unit formed from the storage region of the disk array apparatus and the logical unit formed from the storage region of the other disk array apparatus; a pair formation step of forming the pair when the check step determines that the instruction from the first host computer is valid as a result of instruction check; a writing data copy step of, when the logical unit formed from the storage region of the disk array apparatus is accessed by the first host computer for writing, copying writing data to the other logical unit forming the pair with the logical unit; and a prohibition step of, when a reading request comes from the second host computer for the data stored in the disk array apparatus and/or the other disk array apparatus, prohibiting the second host computer to make an access to the other disk array apparatus until a process ends after started responding to the data reading request. Utilizing the interrelation between information about a plurality of logical units and information about the storage region as the addition result, the writing data copy step copies the writing data to any actual storage region of the other disk array apparatus.

BRIEF DESCRIPTION OF THE DRAWINGS

FIG. 4 is a diagram roughly illustrating a mapping table of the storage system of FIG. 1;

FIG. 5 is a diagram illustrating the process flow for configuring the mapping table of the storage system of FIG. 1;

FIGS. 7A to 7C are all a diagram schematically showing the manner of address conversion applied to writing data of the storage system of FIG. 1;

FIG. 11 is a flowchart showing the process flow in the first storage control unit according to the second embodiment of the present invention, specifically when forwarding inquiry information received from the second storage control unit to the application program;

FIGS. 13A to 13C are all a block diagram showing the system structure of the storage control unit system for realizing the third embodiment of the present invention;

FIGS. 17A and 17B are both a block diagram showing the system structure of a storage control unit system for realizing a sixth embodiment of the present invention.

DESCRIPTION OF THE SPECIFIC EMBODIMENTS

In the below, embodiments of the present invention are described in more detail by referring to the accompanying drawings.

In the embodiments of the present invention, for a storage control unit, any storage device locating its outside becomes available as its own internal volumes through mapping of such external storage devices to its own virtual devices (VDEVs). The resulting internal volumes are provided to any higher-level systems such as personal computers and main frame computers. A detailed description thereof will be given below.

Figure 1:
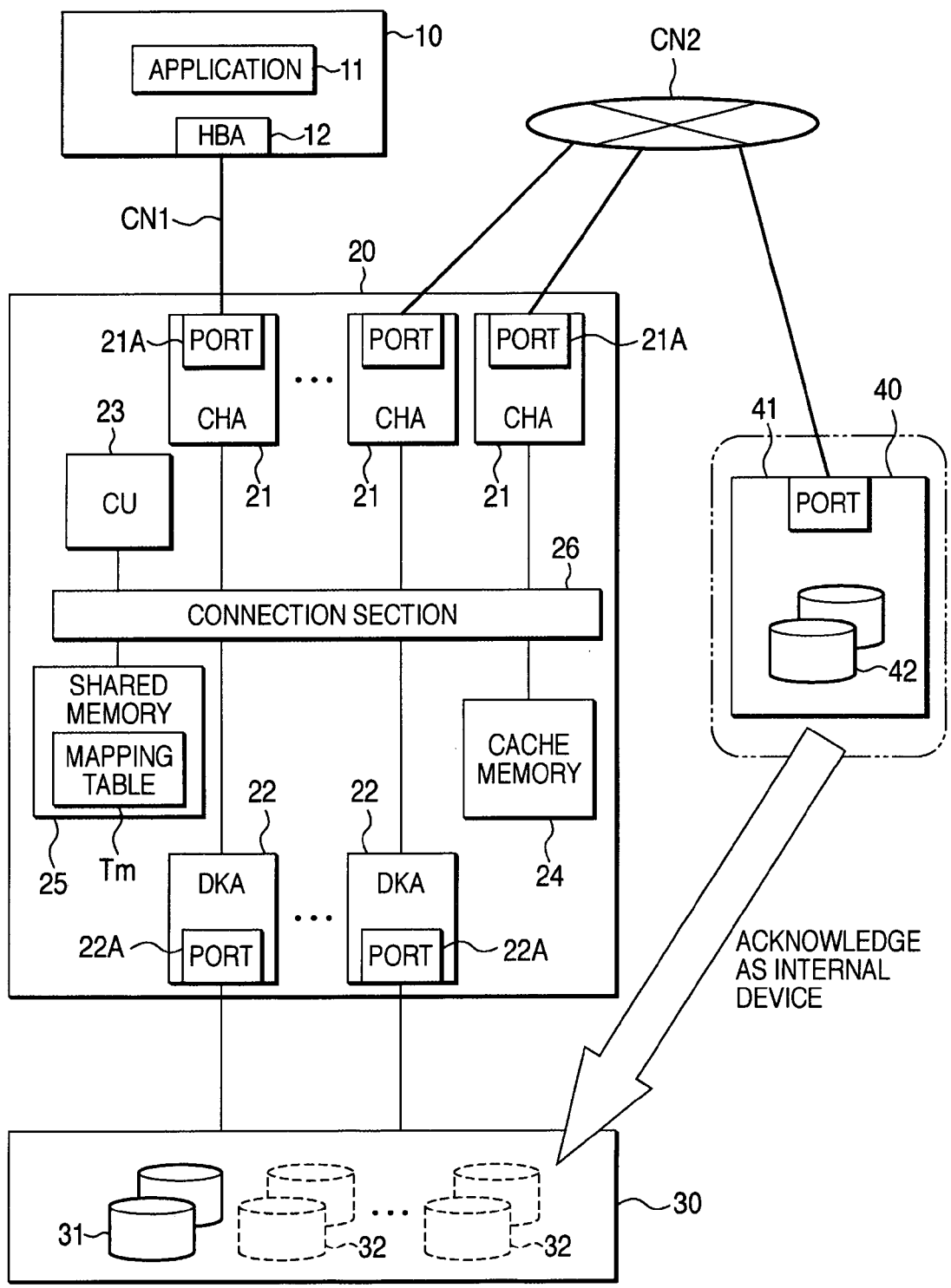
FIG. 1 is a block diagram showing the entire structure of a storage system according to a first embodiment of the present invention.

FIG. 1 is a block diagram showing the main structure of a storage system according to a first embodiment of the present invention.

In FIG. 1, a host unit 10 is a computer unit provided with a CPU (Central Processing Unit) and information processing resources such as memory, and exemplified for personal computers, work stations, and main frames. The host unit 10 includes an information input device (not shown) such as keyboard switches, pointing devices, and microphones, and an information output device (not shown) such as monitor displays and speakers. In addition to such components, the host unit 10 also includes an application program 11 and an adaptor (HBA) 12. The application program 11 is exemplified for database software using storage regions provided by a first storage control unit 20, and the adaptor 12 is used for making access to the first storage control unit 20 over a communications network CN1.

The host unit 10 is connected to the first storage control unit 20 over the communications network CN1, which may be LAN (Local Area Network), SAN (Storage Area Network), the Internet, dedicated line, or dialup (telephone) line as appropriate. Data communications via LAN is carried out in accordance with a TCP/IP (Transmission Control Protocol/Internet Protocol) protocol, for example. When the communications network CN1 is LAN, through file name designation, the host unit 10 requests the first storage control unit 20 for data input/output on a file basis. When the communications network CN1 is SAN, in accordance with a fibre channel protocol, the host unit 10 requests the first storage control unit 20 for data input/output on a block basis. Herein, the block is a data management unit for storage regions provided by a plurality of disk storage devices (disk drives). When the communications network CN1 is LAN, the adaptor 12 is exemplified for a LAN-compatible network card. When the communications network CN1 is SAN, used as the adaptor 12 is a host bus adaptor, for example.

Here, FIG. 1 shows that the host unit 10 is connected only to the first storage control unit 20 via the communications network CN1. This is not restrictive, and the host unit 10 may be connected also to a second storage control unit 40 via a communication network CN2. Similarly to the first communications network CN1, the second communications network CN2 may be SAN, LAN, the Internet, dedicated line, or dialup (telephone) line as appropriate.

The first storage control unit 20 serves as a disk array subsystem or a high-performance intelligent fibre channel switch, and provides storage resources of the second storage control unit 40 to the host unit 10 as its own logical volumes (logical units). This will be described below. There thus no need for the first storage control unit 20 to own its local storage device for direct control.

The first storage control unit 20 is internally structured roughly by a controller section and a storage unit section. The controller section is exemplarily provided with a plurality of channel adaptors (CHA) 21, a plurality of disk adaptors (DKA) 22, a control unit (CU) 23, cache memory 24, shared memory 25, and a connection section 26. The storage unit section, i.e., storage unit 30, includes a plurality of storage devices 31 (32).

In the controller section, the channel adaptors 21 each in charge of data communications with the host unit 10, and each include a communications port 21A for communications with the host unit 10. The channel adaptors 21 each serve as a microcomputer system including a CPU, memory, and others, and interpret and execute various commands received from the host unit 10. The channel adaptors 21 are each allocated with a network address, e.g., IP address or WWN, for their distinction. With such a network address, the channel adaptors 21 can each operate as NAS (Network Attached Storage). If the host unit 10 is plurally included, the channel adaptors 21 can each independently receive requests therefrom.

The disk adaptors 22 are provided for data transmission/ reception between the storage devices 31 and 32 included in the storage unit 30, and each include a communications port 22A for establishing connection to the storage devices 31 and 32. The disk adaptors 22 each serve as a microcomputer system including a CPU, memory, and others, and perform data reading and writing. Specifically, data received by the channel adaptors 21 from the host unit 10 is read via the connection section 26, and the data is written into predetermined addresses of the storage devices 31 and 32 whichever predetermined based on a request (writing command) from the host unit 10. Also, based on a request (reading command) coming from the host unit 10 via both the channel adaptors 21 and the connection section 26, the disk adaptors 22 each read data from the predetermined address of the corresponding storage device 31 or 32 for transmission to the host unit 10 via both the connection section 26 and the channel adaptors 21. Here, if data input/output is performed between the storage devices 31 and 32, the disk adaptors 22 each perform address conversion from logical to physical. If storage devices 31 and 32 are under the control of RAID, the disk adaptors 22 perform data access in accordance with RAID structure.

The control unit 23 is in charge of controlling the first storage control unit 20 in its entirety, and connected with a control console (not shown). The control unit 23 displays on the console (not shown) monitor result information derived by monitoring the first storage control unit 20 for any failure, instructs a lock-out process and others with respect to storage disks e.g., storage devices 31 and 32, based on a command from the console (not shown), and the like.

The cache memory 24 is provided for temporary data storage. Stored therein are data originally coming from the host unit 10 via the channel adaptors 21 and the connection section 26, and data read from the storage devices 31 and 32 by the disk adaptors 22 via the connection section 26. Instead of the cache memory 24, any one or more of the storage devices 31 and 32 may be used as cache disks, i.e., cache memories.

Stored in the shared memory 25 are control information, various tables such as a mapping table Tm (will be described below), and others. The shared memory 25 is set with a working region.

The connection section 26 is provided for establishing connection among the channel adaptors 21, the disk adaptors 22, the control unit 23, the cache memory 24, and the shared memory 25. The connection section 26 can be configured as a high-speed bus, e.g., super-fast crossbar switch, for data transmission through fast switching operation.

The storage unit section, i.e., the storage unit 30, is provided with a plurality of storage devices 31, which are each exemplified for hard disk, flexible disk, magnetic tape, semiconductor memory, or optical disk. In the storage unit 30, the storage device 32 indicated by broken lines shows that a storage device 42 of the second storage control unit 40 is integrated onto the side of the first storage control unit 20.

That is, in the present embodiment, the first storage control unit 20 has the host unit 10 acknowledged the storage device 42 (of the second storage control unit 40) locating its outside as its internal storage device, thereby providing storage resources of the external storage device 42 to the host unit 10.

The second storage control unit 40 includes a communications port 41 and the storage device 42. Other than those, the second storage control unit 40 is allowed to include cannel adaptors and disk adaptors, for example. However, the detailed structure of the second storage control unit 40 has no direct relation to the scope of the present invention, and thus no description is made herein. The second storage control unit 40 is connected to the first storage control unit 20 over the communications network CN2, and the storage device 42 thereof is handled as an internal storage device of the first storage control unit 20.

Figure 2:
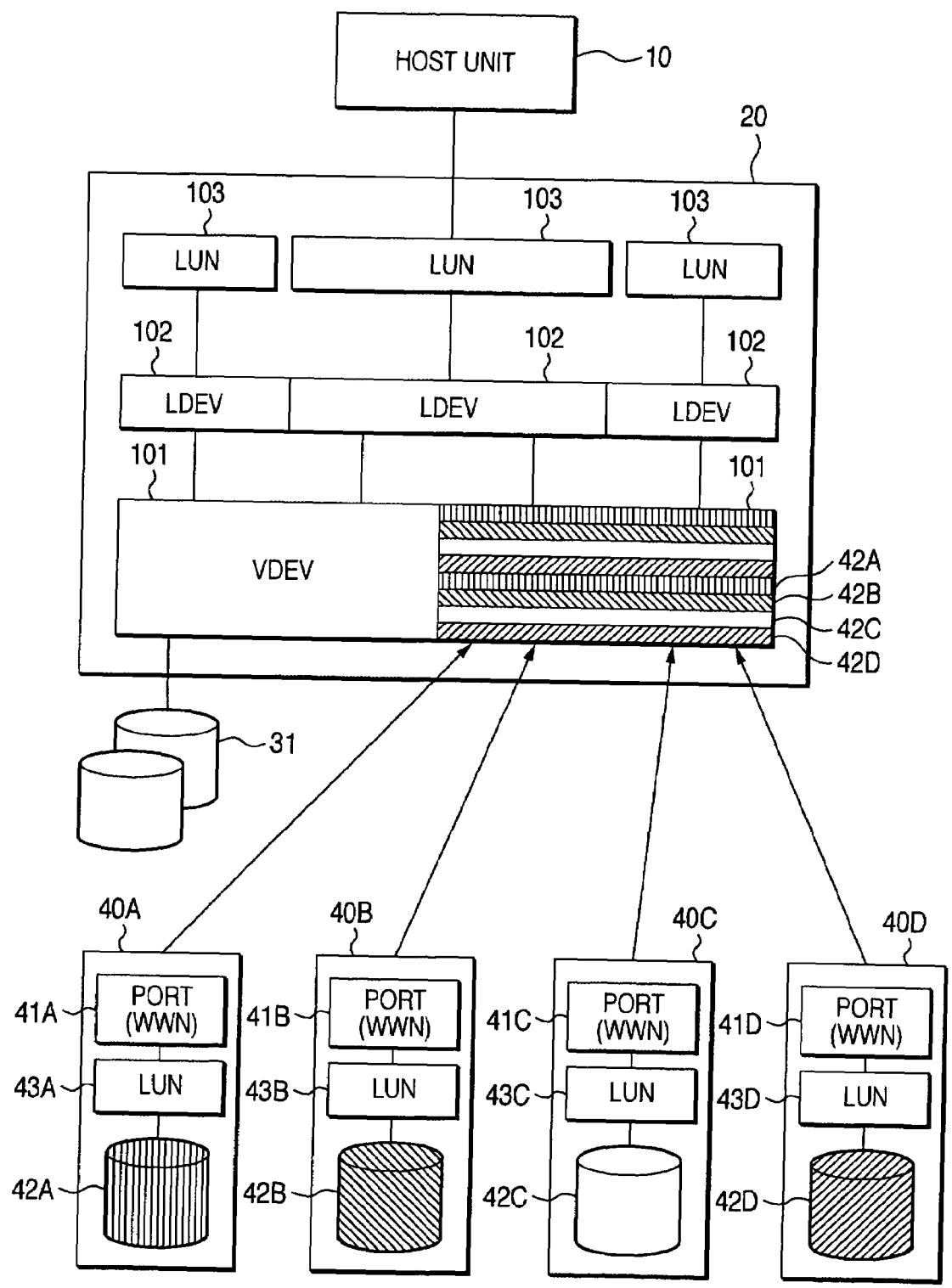
FIG. 2 is a schematic view roughly showing the logical structure of the storage system of FIG. 1.

FIG. 2 is a schematic view roughly showing one exemplary logical structure of the first storage control unit 20 and the storage device 32 of FIG. 1.

As shown in FIG. 2, the first storage control unit 20 has the three-level (logical) storage hierarchy of VDEV 101, LDEV 102, and LUN 103 from lower level to higher.

The VDEV 101 is a virtual device being the lowest level of the logical storage hierarchy, being a virtualization result of physical storage resources to which RAID structure is applicable. That is, the VDEV 101 can be plurally formed from a piece of storage device 31 (i.e., slicing), or the VDEV 101 can be singly formed from a plurality of storage devices 31 (i.e., striping). FIG. 2 shows two of such a VDEV 101, and the VDEV 101 at the left is the one derived by virtualizing the storage device 31 in accordance with a predetermined RAID structure.

On the other hand, the VDEV 101 at the right in FIG. 2 is derived by mapping the storage device 42 of the second storage control unit 40. That is, in the present embodiment, the logical volume (LDEV) provided by the storage device 42 of the second storage control unit 40 is mapped to the VDEV 101 using the mapping table Tm, which will be described later. In this manner, the storage device 42 can be used as the internal volume of the first storage control unit 20. In FIG. 2 example, four storage devices 42A to 42D are striped to configure the VDEV 101 at the right. The storage devices 42A to 42D are separately accessible through identification of their corresponding LUNs 43A to 43D from the communications ports 41A to 41D. The communications ports 41A to 41D are each allocated with WWN being unique identifying information, and the LUNs 43A to 43D are each allocated with a LUN number. Combining such WWN and LUN number can identify which storage device.

The (logically) upper level of the VDEV 101 in the storage hierarchy is the LDEV 102, which is a logical device (logical volume) derived by further virtualizing the virtual device (VDEV). The VDED 101 and the LDEV 102 do not necessarily have the one-to-one relationship, and connection can be established from one VDEV 101 to two LDEV 102, or from a plurality of VDEV 101 to one LDEV 102. The LDEV 102 is accessible by the host unit 10 via each corresponding LUN 103. As such, in the present embodiment, through connection between the storage device 42 and the intermediate storage level (VDEV 101, and LDEV 102) locating between the LUN 103 and the storage device 42, the storage device 42 (of the second storage control unit 40) locating outside of the first storage control unit 20 becomes available as an internal volume of the first storage control unit 20.

Figure 3:
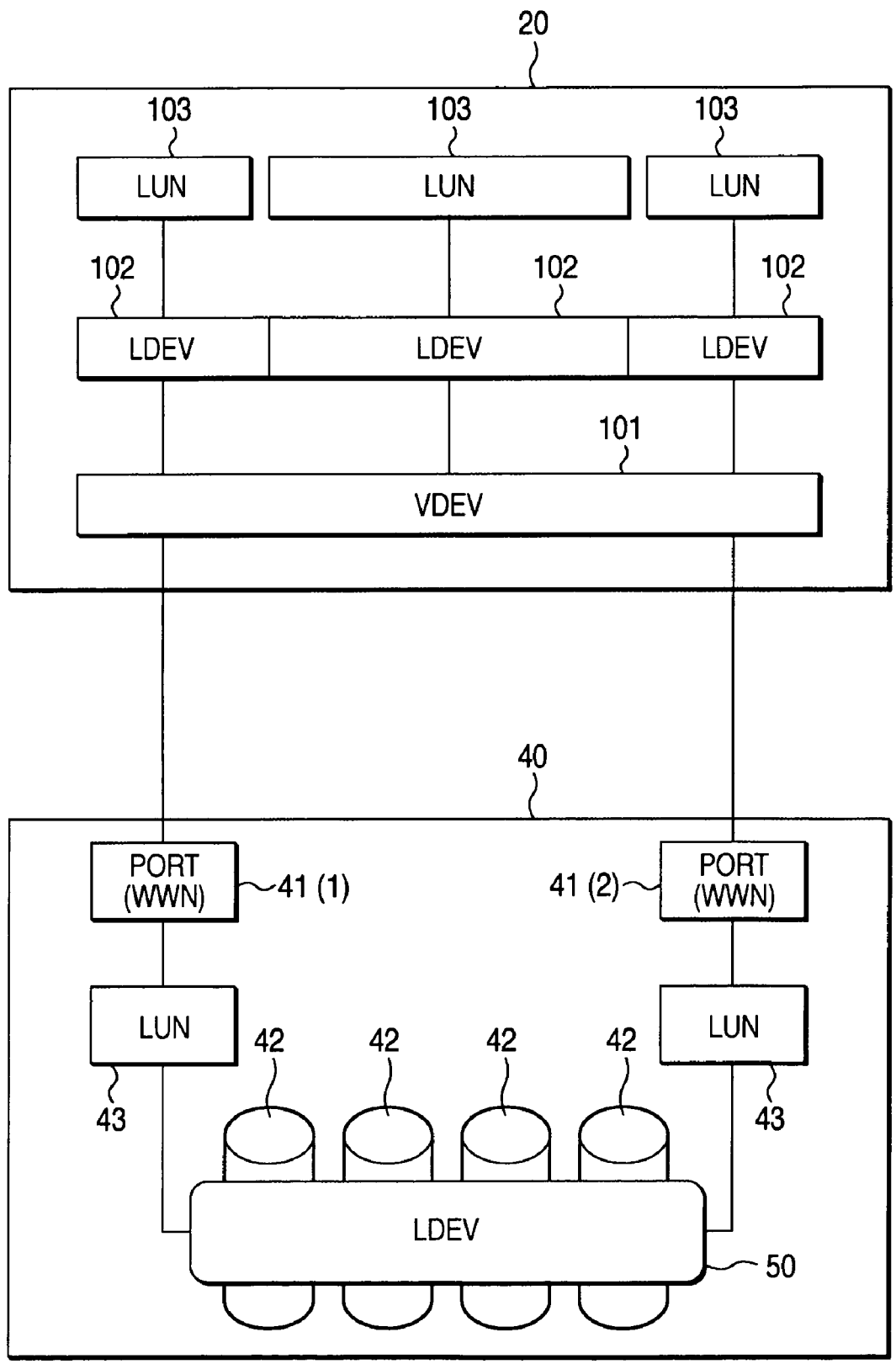
FIG. 3 is a schematic view roughly showing another logical structure of the storage system of FIG. 1.

FIG. 3 is a schematic view roughly showing another exemplary logical structure of the first storage control unit 20 and the storage device 32 of FIG. 1.

In FIG. 3, an LDEV 50 is the one provided by a plurality of storage devices 42 of the second storage control unit 40. The LDEV 50 is in the alternate path configuration having a plurality of paths. To be specific, as shown in the drawing, the LDEV 50 being the logical volume is formed over the storage devices 42 to allow access thereto from two paths, i.e., access data paths, from the first storage control unit 20 side. One path reaches the LDEV 50 from the first communications port 41 (1) via the LUN 43, and the other path reaches the LDEV 50 from the second communications port 41 (2) via another LUN 43. With such a configuration, even if one of those two paths is not available due to failure and others, the LDEV 50 is still accessible from the first storage control unit 20 side via the other path.

As shown in FIG. 3, in such a case where the LDEV 50 is accessible from the first storage control unit 20 side via a plurality of paths, data protection is accordingly made as required. This aims to prevent data update from the fist storage control unit 20 side by accessing the LDEV 50 for data therein using one path while the same data is used from the first storage control unit 20 side using the other path.

In FIG. 3 example, the first storage control unit 20 uses the LDEV 50 locating its outside as its internal LDEV 102 by mapping the storage resources (LDEV 50) of the second storage control unit 40 to its own VDEV 101. Also, a plurality of LDEV 102 are set onto one VDEV 101, to which the external LDEV 50 is mapped via a plurality of paths.

The host unit 10 knows about only the LUNs 103 (of the first storage control unit 20), but not about the structure lower than the LUNs 103. Herein, knowing about the LUNs 103 is inclusive of knowing about the LDEVs 102. In the first storage control unit 20, the LDEVs 102 share the same VDEV 101, which is connected to the same LDEV 50 over a plurality of paths. Thus, in FIG. 3 example, the first storage control unit 20 can be increased with redundancy making use of the alternate path configuration of the second storage control unit 40.

FIG. 4 is a diagram illustrating an exemplary table structure for mapping, to the VDEV 101 (of the first storage control unit 20), the storage device 42 locating external to the first storage control unit 20, in detail, the LDEV 50 provided by a plurality of storage devices 42 of the second storage control unit 40.

Referring to FIG. 4, in the mapping table Tm, a VDEV number and information about the external storage devices 42 (hereinafter, referred to as external device information) are interrelated to each other. The VDEV number is provided for distinction of the VDEVs 100. The external device information includes device identifying information, storage capacity information of the storage devices 42, device type information (e.g., tape device, or disk device), and path information for the storage devices 42, for example. The path information includes identifying information (WWN) unique to the respective communications ports 41 (shown in FIGS. 1 to 3), and LUN number for distinction of the LUNs 43.

Note herein that the device identifying information, WWN, and others found in FIG. 4 are no more than the values set for the sake of expediency. The VDEV 101 assigned with the VDEV number "3" found in the lower part of FIG. 4 is interrelated to three pieces of path information as shown. In other words, the external storage device 42 to be mapped to the VDEV 101 (#3) is in the alternate path structure internally having three paths, and with the alternate path structure acknowledged, the external storage device 42 is mapped to the VDEV 101 (#3). It is known that all of these three paths are leading to the same storage region (in the external storage device 42) from the first storage control unit 20 side. Accordingly, even if any failure occurs to one or two paths, the remaining no-failure-occurring path can lead to any desired data (in the external storage device 42 from the first storage control unit 20 side).

Such a mapping table Tm as shown in FIG. 4 enables mapping of one or more external storage devices 42 to one or more of VDEVs 101 in the first storage control unit 20.

By next referring to FIG. 5, described is an exemplary technique of mapping the storage device 42 external to the first storage control unit 20 to the VDEV 101.

FIG. 5 is a time chart showing the main part of the processing operation to be executed between the first and second storage control units 20 and 40 at the time of mapping.

In FIG. 5, the first storage control unit 20 first logs in the second storage control unit 40 via an initiator port (21A) of the channel adaptor 21 (step S1). After this processing operation, the second storage control unit 40 makes a response to the login of the first storage control unit 20 to complete the login (step S2). Then, the first storage control unit 20 forwards, to the second storage control unit 40, an inquiry command exemplarily approved by SCSI (Small Computer System Interface) to ask for a response about the details of the storage device 42 of the second storage control unit 40 (step S3).

Here, the inquiry command is used to define the inquiring device by type and configuration, and thereby rendering the (storage) hierarchy of the inquiring device easy to grasp its physical configuration. With such an inquiry command, the first storage control unit 20 can acquire, from the second storage control unit 40, information such as unit name, device type, manufacturing number (product ID), LDEV number, various version information, and vendor ID (step S4). The second storage control unit 40 responsively forwards thus inquired information to the first storage control unit 20, sending back a response as such (step S5).

Next, the first storage control unit 20 makes entries of the information thus acquired from the second storage control unit 40 to any predetermined part of the mapping table Tm (of FIG. 4) (step S6), and then reads the storage capacity of the storage device 42 in the second storage control unit 40 (step S7). Responding to the inquiry from the first storage control unit 20, the second storage control unit 40 forwards back the storage capacity of the storage device 42 (step S8), sending back a response as such (step S9). The first storage control unit 20 makes entries of the storage capacity of the storage device 42 to any predetermined part of the mapping table Tm (FIG. 4)(step S10).

By going through such a processing operation, the mapping table Tm (of FIG. 4) can be configured. For data input/output with the external storage device 42 (external LUN, i.e.,external LDEV 50) mapped to the VDEV 101 of the first storage control unit 20, another table that will be described later is referred to for address conversion and others.

Next, by referring to FIGS. 6A to 8B, described is data input/output between the first and second storage control units 20 and 40. First, exemplified is data writing by referring to FIGS. 6A to 7C.

Figure 6A:
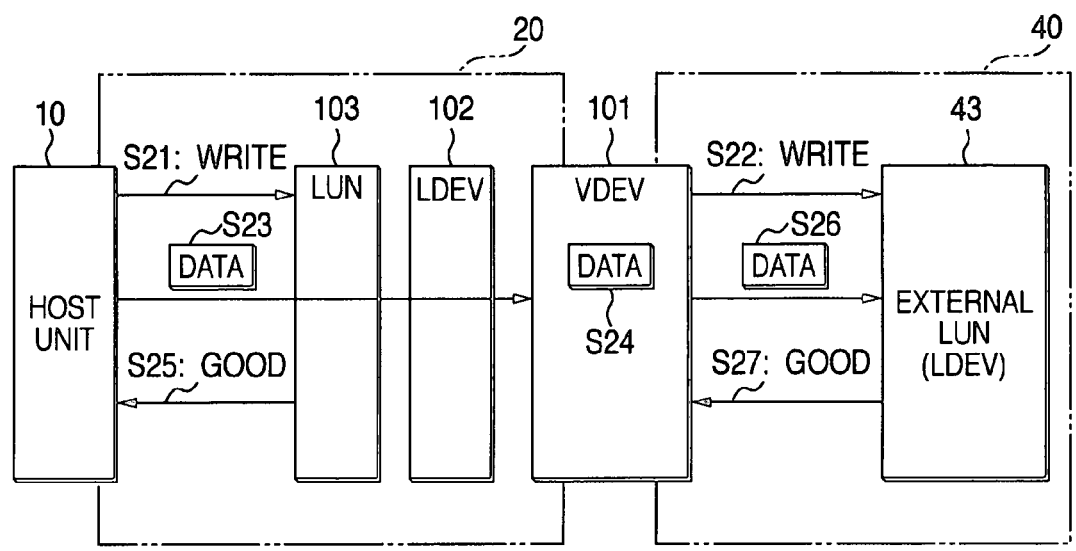
FIGS. 6A and 6B are both a conceptual view of a case where data writing is performed to an external storage device virtualized as an internal volume of the storage system of FIG. 1.
Figure 6B:
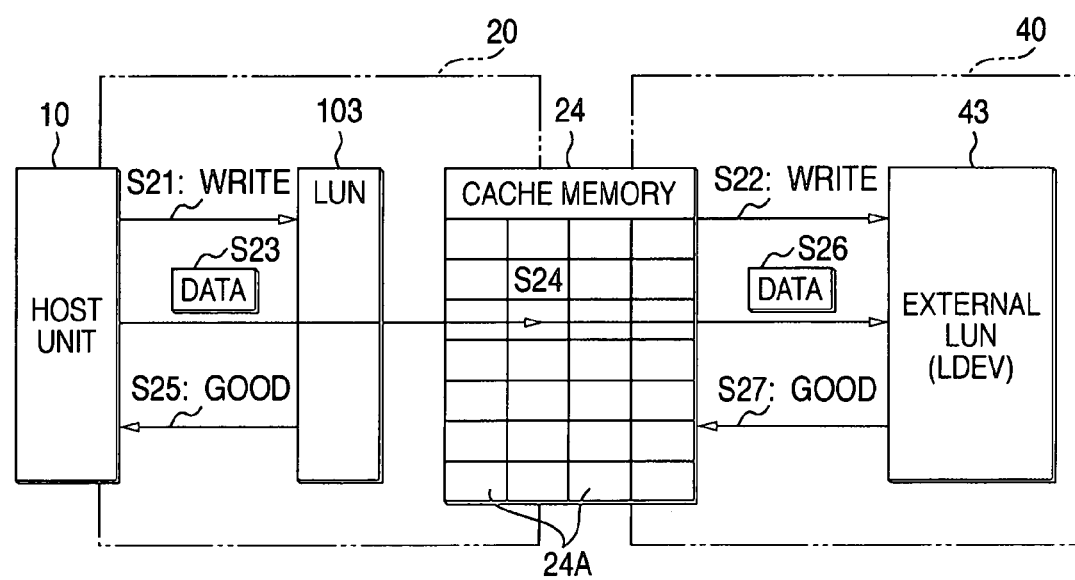

FIGS. 6A and 6B are both a schematic view showing the process of the host unit 10 at the time of data writing to a logical volume of the first storage control unit 20, and FIGS. 7A to 7C are all a diagram illustrating the flow of processing operation of FIGS. 6A and 6B by interrelating that with various types of tables.

The host unit 10 is allowed for data writing to logical volumes (LDEVs 102) provided by the first storage control unit 20. For example, through a zoning technique of setting a virtual SAN subnetwork in SAN, or a LUN masking technique with which the host unit 10 retains a list of accessible LUNs, the host unit 10 can be made accessible only to the specific LDEV 102.

When the LDEV 102 to which the host unit 10 performs data writing is connected to the storage device 31 inside of the first storage control unit 20 via the VDEV 101, data writing is performed through a normal process. In detail, the data from the host unit 10 is once stored in the cache memory 24, and then stored in a predetermined address of the predetermined storage device 31 from the cache memory 24 via the disk adaptor 22. At this time, the disk adaptor 22 performs address conversion from logical to physical. With RAID structure, the same data is stored into a plurality of storage devices 31, for example.

When the LDEV 102 to which the host unit 10 performs data writing is connected to the storage device 42 external to the first storage control unit 20 via the VDEV 102, data writing is performed with the process flow as shown in FIGS. 6A and 6B. FIG. 6A is a flowchart mainly showing the storage hierarchy, and FIG. 6B is a flowchart mainly showing how the cache memory 24 is used.

In FIGS. 6A and 6B, the host unit 10 first explicitly shows the LDEV number with which the LDEV 102 is identified for data writing, and the WWN with which the communications port 21A is identified for accessing the LDEV 102. Then, a writing command (Write) is issued with respect to the first storage control unit 20 (step S21) After receiving the writing command, the first storage control unit 20 generates another writing command for transmission to the second storage control unit 40 (step S22). To generate such another writing command, the first storage control unit 20 updates writing address information and others found in the writing command received from the host unit 10 in accordance with the external LDEV 50.

Then, the host unit 10 forwards writing data to the first storage control unit 20 (step S23). Via the LDEV 102 and the VDEV 101 (step S24), the (writing) data thus received by the first storage control unit 20 is then transferred to the external LDEV 50 (step S26). Here, at the point when the data provided by the host unit 10 is stored in the cache memory 24, the first storage control unit 20 sends a writing completion response (Good) back to the host unit 10 (step S25). At the point when receiving the data from the first storage control unit 20 (or at the point when completed with writing to the storage device 42), the second storage control unit 40 forwards a writing completion report to the first storage control unit 20 (step S26). That is, the timing when the first storage control unit 20 reports writing completion to the host unit 10 (step S25) is not synchronous with the timing when the data is actually stored in the storage device 42 (asynchronous mode). Accordingly, the host unit 10 is freed from the data writing process before the actual data storage in the storage device 42, and can go through another process.

In FIG. 6B, the cache memory 24 is provided with a plurality of subblocks 24A. The first storage control unit 20 converts, into a subblock address, the logical block address designated by the host unit 10, and then performs data storage into the predetermined part of the cache memory 24 (step S24).

By referring to FIGS. 7A to 7C, described next is how data conversion is performed using tables varying in type. As shown in upper part of the drawing, the host unit 10 performs data transmission, to the predetermined communications port 21A, with LUN number (LUN#) and logical block address (LBA) designated. Based on a first conversion table T1 of FIG. 7A, the first storage control unit 20 converts the data input for the LDEV 102 (i.e., LUN#+LBA) into data for the VDEV 101. Here, the first conversion table T1 is a LUN-LDEV-VDEV conversion table for converting data designating the internal LUN 103 into data for the VDEV 101.

In this table T1, for example, interrelation is established among the LUN number (LUN#), the number assigned to the LDEV 102 corresponding to the LUN 103 (LDEV#), the maximum slot number, the number assigned to the VDEV 101 corresponding to the LDEV 102 (VDEV#), the maximum slot number, and others. By the use of the table T1, the data (LUN#+LBA) from the host unit 10 is accordingly converted into data for the VDEV 101 (VDEV#+SLOT#+SUBBLOCK#).

Next, by the use of a second conversion table T2 of FIG. 7B, the first storage control unit 20 converts the data for the VDEV 101 into data for storage in the external LUN (LDEV 50) of the second storage control unit 40. In this second conversion table T2, interrelation is established among the number assigned to the VDEV 101 (VDEV#), the number assigned to the initiator port for transmitting data coming from the VDEV 101 to the second storage control unit 40, the WWN for identifying the data-transferring communications port 41, and the LUN number accessible via the identified communications port. Based on such a second conversion table T2, the first storage control unit 20 converts addressee information of data to be stored into the format of initiator port#+WWN+LUN#+LBA. The resulting data changed with its addressee information as such reaches the designated communications port 41 via the communications network CN2 from the designated initiator port. Then, the data is stored in the predetermined part of the LDEV 50 accessible by the designated LUN 43. As already described above, the LDEV 50 is virtually configured over a plurality of storage devices 42. Thus, the data address is converted into the physical address, and the result is stored in the predetermined address of any predetermined disk.

FIG. 7C shows another second conversion table T2*a*, which is used for applying striping or RAID to the VDEV 101 derived for the external storage device 42. In the conversion table T2*a*, interrelation is established among the VDEV number (VDEV#), stripe size, RAID level, number for identifying the second storage control unit 40 (SS# (storage system number)), initiator port number, WWN of the communications port 41, and the number assigned to the LUN 43. In FIG. 7C example, the VDEV 101 configures RAID 1 using four external storage control units specified by SS#(1, 4, 6, and 7). The three LUNs (#0, #0, and #4) allocated to the SS#1 are set to the same device (LDEV#) Here, the volume of LUN#0 is of the alternate path configuration including two access data paths. As such, in the present embodiment, by configuring the VDEV 101 from a plurality of externally-located logical volumes (LDEVs), functions such as striping and RAID can be additionally provided to the host unit 10.

Figure 8A:
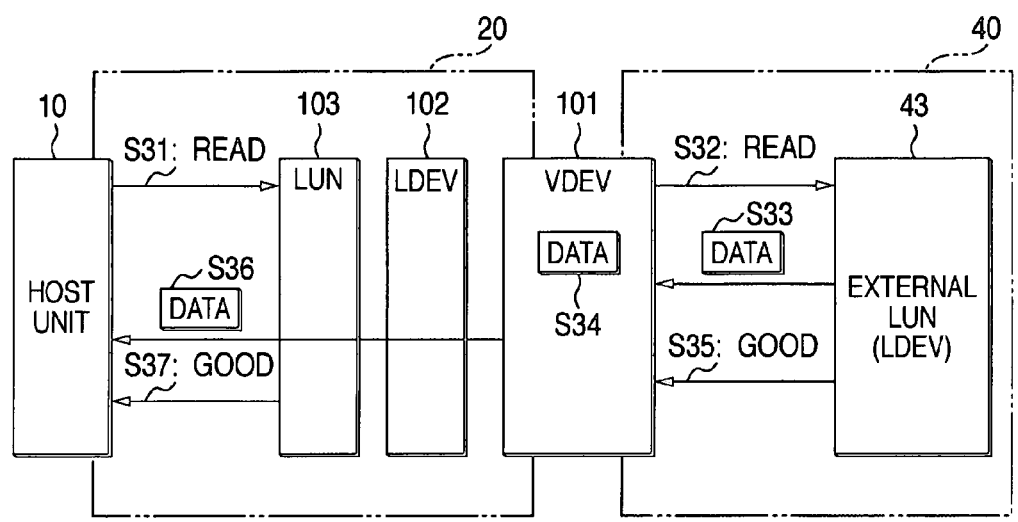
FIGS. 8A and 8B are both a conceptual view of a case where data reading is performed from the external storage device virtualized as the internal volume of the storage system of FIG. 1.
Figure 8B:
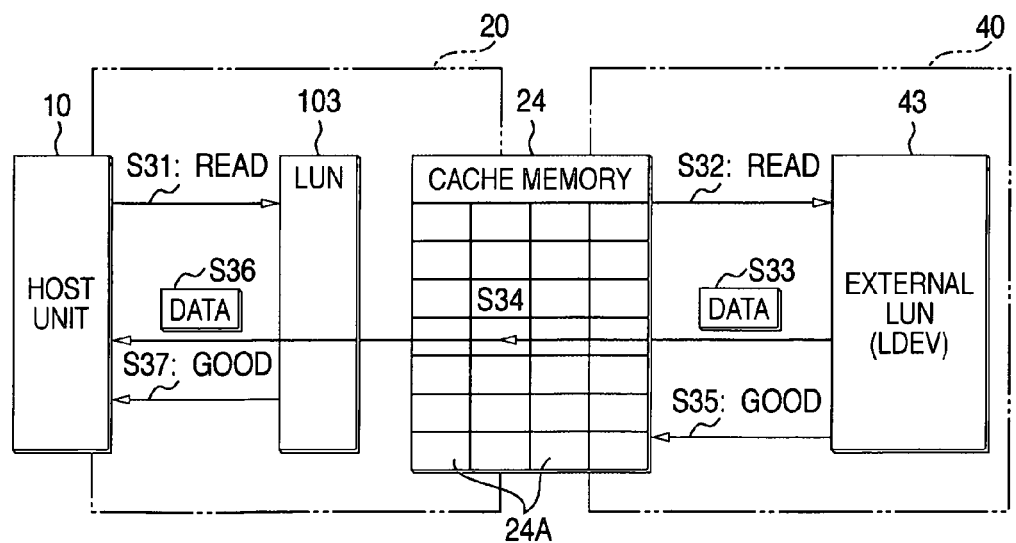

By referring to FIGS. 8A and 8B, described is the process flow of a case where the host unit 10 reads data from the LDEV 50 of the second storage control unit 40.

In FIGS. 8A and 8B, the host unit 10 first forwards a data reading command to the first storage control unit 20 through designation of the communications port 21A (step S31). After receiving this reading command, the first storage control unit 20 generates another reading command for reading the requested data from the second storage control unit 40. Thus generated reading command is transmitted to the second storage control unit 40 (step S32). In response to this reading command, the second storage control unit 40 accordingly reads the requested data from the storage device 42 for transmission to the first storage control unit 20 (step S33), and also reports normal completion of data writing thereto (step S35). As shown in FIG. 8B, the first storage control unit 20 stores the data received from the second storage control unit 40 in the predetermined area of the cache memory 24 (step S34).

Next, the first storage control unit 20 reads the data thus stored in the cache memory 24, and performs address conversion. Then, the data is forwarded to the host unit 10 via the LUN 103 and others (step S36), and a data reading completion report is made to the host unit 10 (step S37). In this series of processing operation at the time of data reading, the conversion operation described by referring to FIGS. 7A to 7C is performed in the reverse order.

FIGS. 8A and 8B show as if data were always read from the second storage control unit 40 responding to a request coming from the host unit 10 for storage into the cache memory 24. This is surely not restrictive, and the data stored in the external LDEV 50 may be entirely or partially stored in advance in the cache memory 24. If this is the case, a reading command from the host unit 10 leads to immediate data reading from the cache memory 24 for transmission to the host unit 10.

As described in detail in the foregoing, according to the present embodiment, any external logical volumes can be handled as internal logical volumes, or any external storage devices 42 as virtual internal storage devices thanks to the configuration in which the external storage devices 42 (to be exact, external LDEV 50) are mapped to the VDEV 101. Thus, even if the second storage control unit 40 is of a previous type incapable of establishing direct connection with the host unit 10, including the first storage control unit 20 of an advanced type enables reuse of the storage resources of the previous-type unit as those of the advanced-type unit. The storage resources are then provided to the host unit 10. With such a structure, the previous-type storage control unit can be integrated into the advanced-type so that their storage resources can be effectively used.

Further, assuming that the first storage control unit 20 is of a high-performance intelligent advanced type, its high-performance computer resources (e.g., cache capacity, CPU processing speed) can cover the under performance of the second storage control unit 40. Thereby, using virtual internal volumes making full use of the external storage devices 42, high-performance services can be offered to the host unit 10.

Still further, the LDEV 50 configured over the external storage devices 42 can be added with functions such as striping, expansion, division, RAID, and the like. Accordingly, compared with a case where any external volumes are directly mapped to the LUN 103, usage flexibility is favorably increased, and usability is successfully improved.

Still further, any external logical volumes become available as internal logical volumes. Thus, various functions available for the first storage control unit 20 with respect to the LDEV 102 being normal internal volumes become applicable to any virtual internal volumes (LDEV connected to LDEV 50). Such various functions are exemplified for MRCF (Multiple RAID Coupling Feature), remote copy, CVS (Customizable Volume Size), and LUSE (LU Size Expansion). Specifically, MRCF is a function allowing replication of logical volumes without data going through the host unit 10 (host free). Remote copy is a function of synchronizing the storage contents of a primary volume placed in a local site and those of a secondary volume in a remote site. CVS is a variable volume function with which any arbitrary size within standard level can be applied to the logical volume. LUSE is a LUN size expansion function with which a plurality of logical volumes can be integrated together to reduce the LUN number for the host unit 10 to acknowledge.

What is more, the VDEVs 101 each configured from external logical volumes can be connected to a plurality of LDEVs 102, respectively. Thus, connecting the host unit 10 all to the LUNs 103 of the LDEVs 102 will derive the alternate path configuration, and load distribution effects.

Moreover, an inquiry command helps full grasp of alternate path configuration of the second storage control unit 40 for mapping to the VDEV 101. The alternate path configuration of the second storage control unit 40 can be thus inherited in the first storage control unit 20, favorably increasing redundancy of the storage system.

Unlike the present invention in which external storage devices are handled as virtual internal storage devices, the conventional technique referred to in the Background Art Section (Patent Document 2) merely reconfigures, on a sector basis, local storage devices, i.e., volumes of storage devices under the direct control of storage control units. Similarly, another conventional technique (Patent Document 3) is not putting the external storage devices 42 to use as virtual internal storage devices as in the present embodiment, but merely optimizing area size depending on the storage capacity of local storage devices.

Figure 9A:
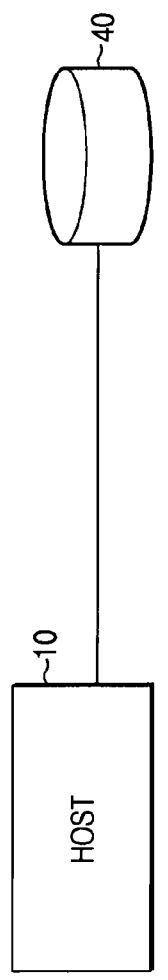
FIGS. 9A to 9C are all a block diagram showing the system structure of a storage control unit system for realizing a second embodiment of the present invention.
Figure 9B:
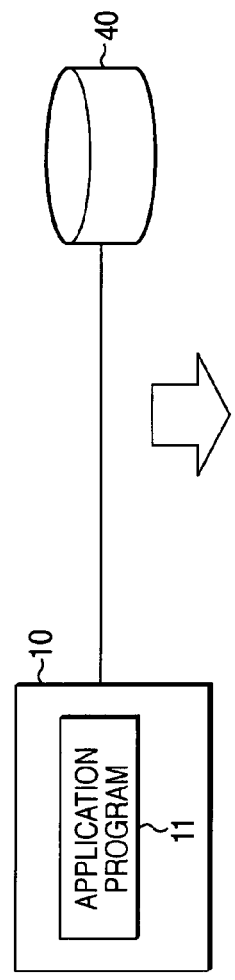

When the application program 11 on the host unit 10 of FIG. 1 makes an attempt to acquire inquiry information from the second storage control unit 40, the data communications performance becomes sometimes poor between the host unit 10 and the second storage control unit 40. This is caused due to poor connection therebetween as shown in FIG. 9A. Further, at the time of acquisition of the inquiry information, such a connection failure between the host unit 10 and the second storage control unit 40 may prevent the application program 11 from supporting the inquiry information in the second storage control unit 40 as shown in FIG. 9B.

Figure 9C:
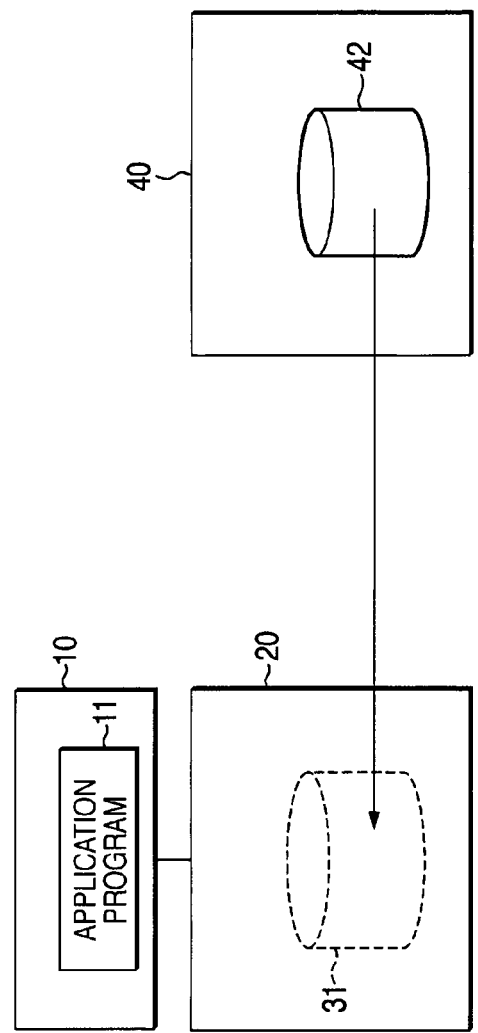

In such cases, as shown in FIG. 9C, the storage device (42) (as shown in FIG. 1) in the second storage control unit 40 is mapped to the virtual device (VDEV 101) derived by virtualizing the storage device (31) in the first storage control unit 20 (as shown in FIG. 1). Thereby, the first storage control unit 20 can cause the host unit 10 to acknowledge the storage device (42) in the second storage control unit 40 as its own virtual device (VDEV 101). As a result, the storage device (42) in the second storage control unit 40 being device resources (data storage areas) external to the first storage control unit 20 can be used as resources of any devices connectable to the host unit 10. This is applicable to inquiry information support in the second storage control unit 40 by the application program 11.

Figure 10:
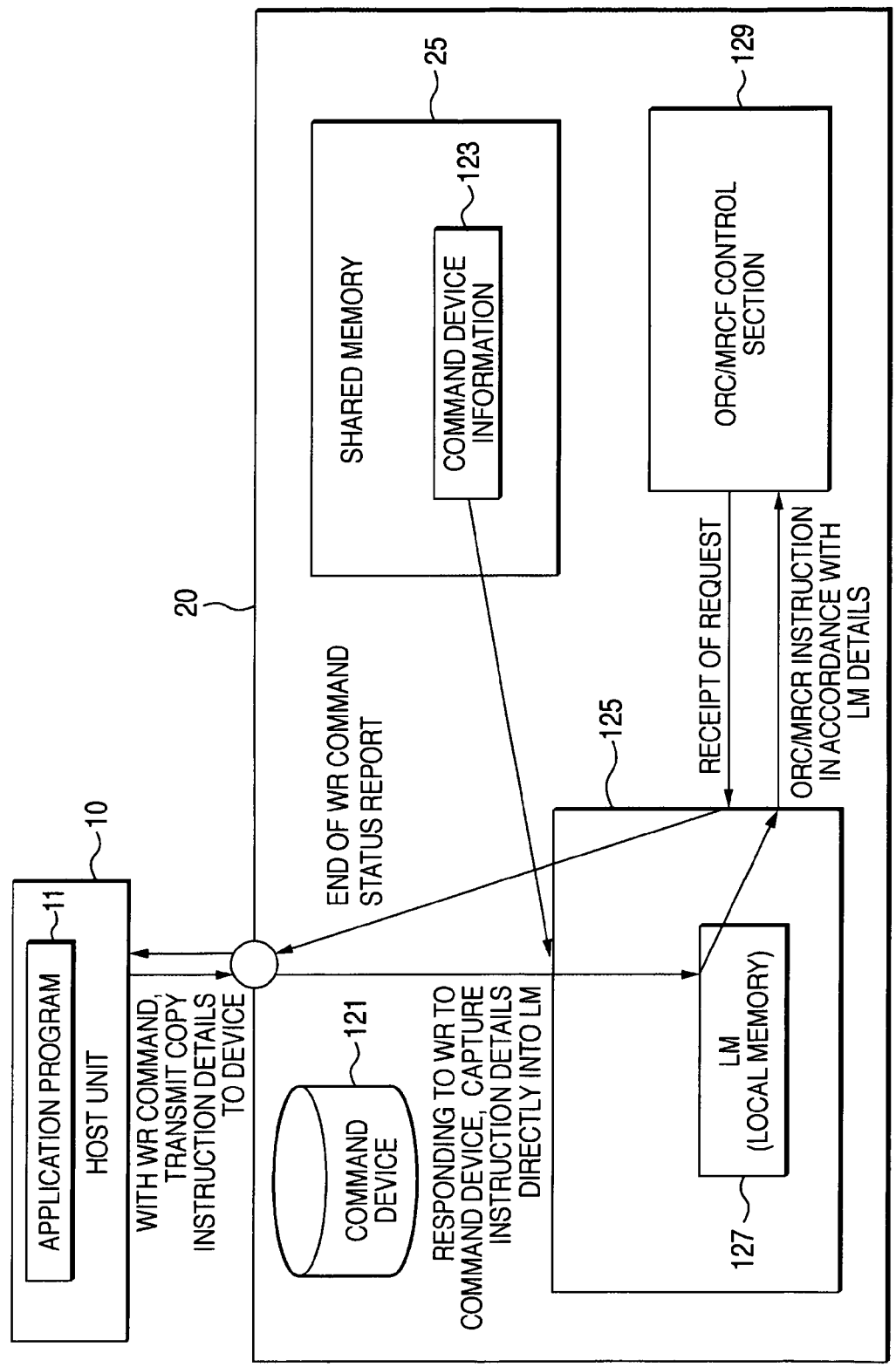
FIG. 10 is a block diagram showing the process flow in a first storage control unit according to the second embodiment of the present invention, specifically when forwarding inquiry information received from a second storage control unit to an application program.

FIG. 10 is a block diagram showing the process flow of the first storage control unit 20 according to a second embodiment of the present invention, specifically when forwarding inquiry information received from the second storage control unit 40 to the application program 11 of the host unit 10.

In FIG. 10, a command device 121 denotes a special LU (logical unit). The shared memory (SM) 25 stores command device information 123 indicating that the command device 121 is a special LU, and inquiry information from the second storage control unit 40 (being an external storage) for transfer to (the application program 11 of) the host unit 10.

A channel processor (CHP) 125 is placed in the channel adaptor (CHA) 21 of FIG. 1. The channel processor 125 includes local memory (LM) 127, and reads the command device information 123 from the shared memory (SM) 25, and the inquiry information and others from the second storage control unit 40. When copy instruction details come from the application program 11 as an SCSI writing command issued toward the command device 121, the channel processor 125 responsively accepts the writing command. Herein, the copy instruction details are processing details for receiving the inquiry information from the second storage control unit 40. Then, the channel processor 125 captures the copy instruction details directly into the local memory 127 for writing the writing command to the command device 121.

The channel processor 125 analyzes the copy instruction details without writing to a disk via a disk adaptor (DKA), and based on the analysis result, outputs an open remote copy/MRCF instruction to an open remote copy/MRCF control section 129. When a determination result comes from the open remote copy/MRCF control section 129 telling that the open remote copy/MRCF instruction details have no problem (based on the analysis result), the channel processor 125 makes a reply telling that the writing response is normally made as a writing command completion status report to the host unit 10. Then, to be ready for the following reading of the inquiry information by the host unit 10, the channel processor 125 searches the shared memory 25 for inquiry information for returning to the host unit 10. As such, generated is output data from the first storage control unit 20 to the host unit 10.

If received from the open remote copy/MRCF control section 129 is the determination result telling that the open remote copy/MRCF instruction details have some problem (contradictory)(based on the analysis result), the channel processor 125 makes a reply telling that writing response is erroneously made as a writing command completion status report to the host unit 10. When an SCSI reading command issued for the command device 121 comes from the application program 11 to the first storage control unit 20 for reading the output data relating to the inquiry information, the channel processor 125 responsively accepts the reading command. If confirmed that (the application program 11 of) the host unit 10 is the same as the one having previously issued the writing command, the channel processor 125 sends the output data back to the host unit 10 as a return value of the reading response to the host unit 10.

The open remote copy/MRCF control section 129 is an independent processor separately provided from the channel processor 125. Therein, a determination is made whether the open remote copy/MRCF instruction details from the channel processor 125 are valid or not (OK/NG), and then the determination result is notified to the channel processor 125.

FIG. 11 is a flowchart showing the process flow in the first storage control unit 20 according to the second embodiment of the present invention, specifically when forwarding the inquiry information received from the second storage control unit 40 to the application program 11 of the host unit 10.

In FIG. 11, the host unit 10 first issues, toward the command device 121 of the first storage control unit 20, a (SCSI) writing command including instruction details (copy instruction details) for receiving the inquiry information (step S151), the channel processor 125 responsively accepts the command. Then, the copy instruction details are directly captured into the local memory 127 to write the writing command to the command device 121 (step S152). Then, the channel processor 125 analyzes the copy instruction details, and based on the analysis result, outputs an open remote copy/MRCF instruction to the open remote copy/MRCF control section 129 (step S153).

When a determination result comes from the open remote copy/MRCF control section 129 telling that the open remote copy/MRCF instruction details have no problem (based on the analysis result), the channel processor 125 makes a reply telling that the writing response is normally made as a writing command completion status report to the host unit 10 (step S154). Then, to be ready for the following reading of the inquiry information by the host unit 10, the channel processor 125 searches the shared memory 25 for the inquiry information for returning to the host unit 10. As such, generated is output data from the first storage control unit 20 to the host unit 10 (step S155).

If received from the open remote copy/MRCF control section 129 is the determination result telling that the instruction details have some problem (contradictory), the channel processor 125 makes a reply telling that writing response is erroneously made as a writing command completion status report to the host unit 10 (step S156).

When an SCSI reading command is transferred to the first storage control unit 20 from the application program 11 issued toward the command device 121 for reading the output data relating to the inquiry information (step S157), the reading command is responsively accepted (step S158). If confirmed that (the application program 11 of) the host unit 10 is the same as the one having previously issued the writing command, the channel processor 125 sends the output data back to the host unit 10 as a return value of the reading instruction to the host unit 10 (step S159).

The issue here is that, when (the application programs of) the host unit 10 and another host unit external to the first storage control unit 20 (hereinafter, referred to as "external host unit") (not shown in FIG. 1 and others) make an attempt to acquire inquiry information from the second storage control unit 40 of FIG. 1 and others (hereinafter, "external storage control unit"), the external storage control unit may not be structurally ready for a (remote copy) command from the external host unit. In such cases, another external storage control unit is included, being structurally ready for a (remote copy) command from an external host unit 163. Such an external host unit is denoted by a reference numeral 161 in FIG. 12A. This allows an application program 165 of the external host unit 163 to acquire, via thus newly provided external storage control unit 161, the inquiry information from such an external storage control unit 167 structurally not ready for the (remote copy) command.

Figure 12A:
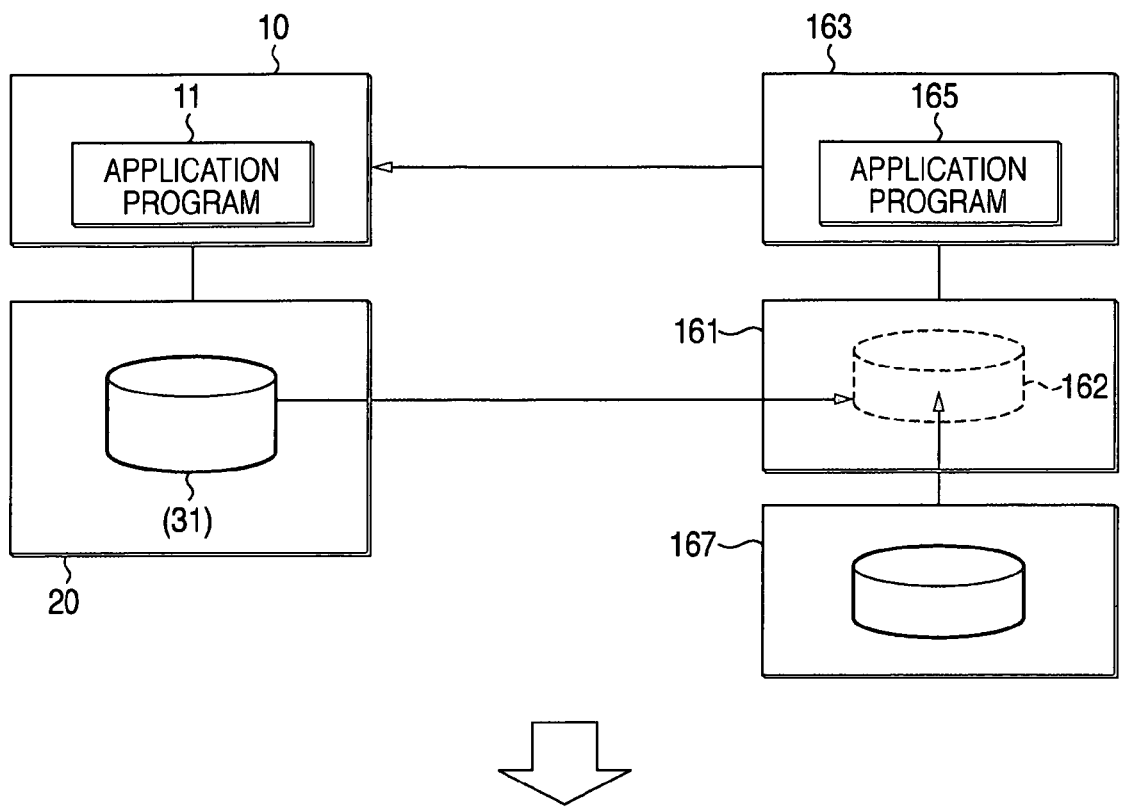
FIGS. 12A and 12B are both a block diagram showing the system structure of a storage control unit system for realizing a third embodiment of the present invention.

As shown in FIG. 12A, in the external storage control unit 161, the storage device (31) (exemplarily shown in FIG. 1) in the first storage control unit 20 is mapped to the virtual device (VDEV) 162. Herein, the virtual deice 162 is a device derived by virtualizing the storage device in the external storage control unit 161, e.g., storage device 42 in the second storage control unit 40 of FIG. 1. Thereby, the external storage control unit 161 causes the external host unit 163 to acknowledge the storage device (31) in the first storage control unit 20 as its own virtual device (VDEV) 162.

Figure 12B:
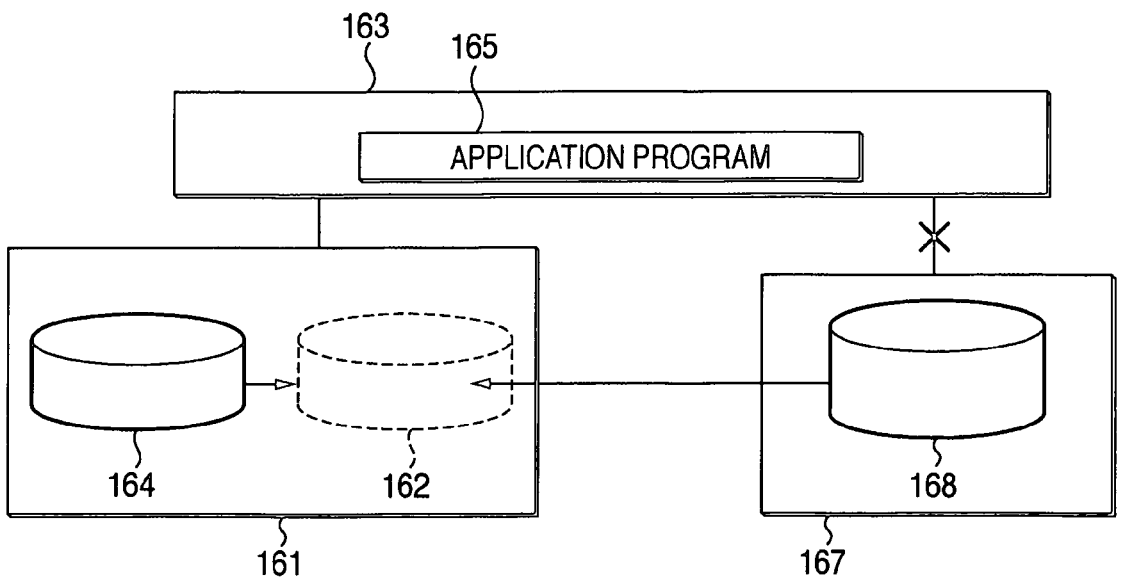

Referring next to FIG. 12B, the application program 165 cannot directly support the inquiry information in the external storage control unit 167, because no connection is establishable between the external host unit 163 and the external storage control unit 167. Thus, as shown in FIG. 12B, to realize such direct support of the inquiry information by the application program 165, the storage device in the external storage control unit 167 is mapped to the virtual device (VDEV) 162, which is the resulting device derived by virtualizing the storage device in the external storage control unit 161. Note here that, to this virtual device 162, (data of) the storage device of the external storage control unit 161 is also copied. In this case, however, it is unknown even in the external storage control unit 161 to which storage device copy is executed, and to which storage device mapping has been done. As such, it is impossible for the application program 165 side to issue an instruction of copy inquiry information and others to the external storage control unit 161.

Figure 13A:
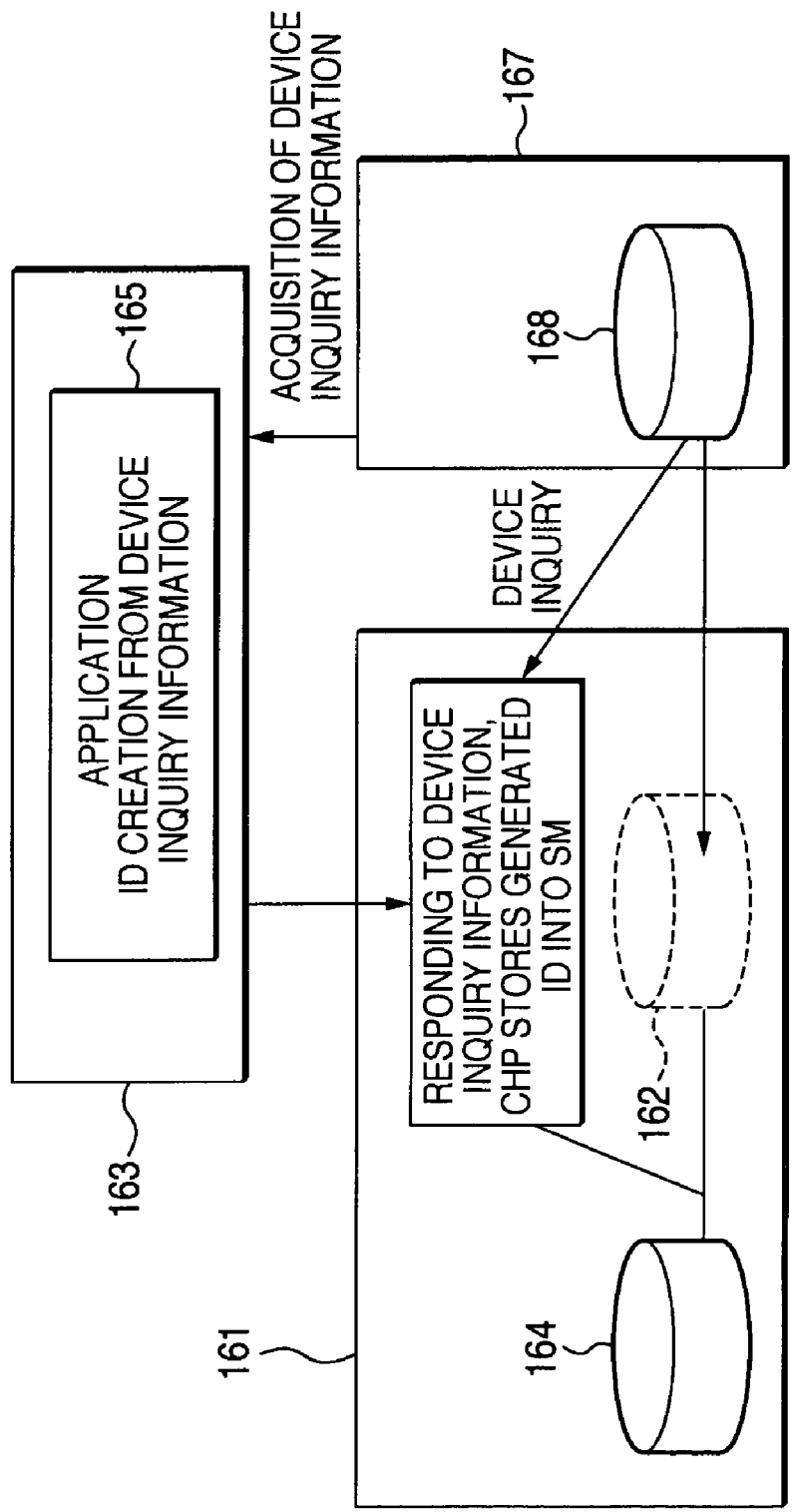

In view thereof, in a third embodiment of the present invention, as shown in FIG. 13A, the external storage control unit 161 stores an ID, which is derived from device inquiry information relating to the storage device 162 having applied with mapping. To be more specific, as shown in FIG. 13B, the external storage control unit 161 stores a mapping table in shared memory similar to the shared memory 25 of FIG. 1. The mapping table shows the interrelation between the virtual device (VDEV) 162 in the storage control unit 161 and a storage device 168 in the external storage control unit 167 mapped to the virtual device (VDEV) 162. Stored in the mapping table is device inquiry information ("external device information" in FIG. 13A) about the storage device 168 in the external storage control unit 167. The device inquiry information includes device identifying information (ID), which is generated by extracting parts of the device inquiry information being unique to the storage device 168 in the external storage control unit 167. The device identifying information (ID) includes, for example with DF, Vender ID, Product ID, serial number in Vender Specific, and LDEV number.

FIG. 13C shows a part of standard inquiry data, and three pieces of data of FIG. 13C are unique values used for generating the device identifying information (ID).

Referring back to FIG. 13A, between the external storage control units 161 and 167, SCSI commands can come and go for writing, reading, inquiring, and others. The device information (ID) is previously extracted from the device inquiry information by the channel processor (CHP) in the external storage control unit 161 for storage in the mapping table (in the shared memory).

The application program 165 (of the external host unit 163) receives the device inquiry information from the external storage control unit 167 via the channel processor (CHP) in the external storage control unit 161, and then generates device identifying information (ID) therefrom. Then, using the device information (ID) and the device identifying information (ID) about the specific storage device 164 in the external storage control unit 161 as copying key, the application program 165 issues an instruction of copying the inquiry information and others to the external storage control unit 161.

Responding to the copy instruction from the application program 165, in the external storage control unit 161, based on the ID, the channel processor (CHP) searches for a storage device allocated as the virtual device (VDEV) 162 in the external storage control unit 161 based on the ID. Then, thus found storage device 162 and other storage devices in the storage control unit 161 accordingly execute copy. In this manner, the application program 165 acquires the inquiry information of thus found storage device 162 and that of other storage devices in the storage control unit 161.

As such, the application program 165 has no need to know virtual allocation between the storage devices in the external storage control units 167 and 161 before executing copy from any specific storage device in the external storage control unit 161 to derive desired inquiry information.

Figure 14:
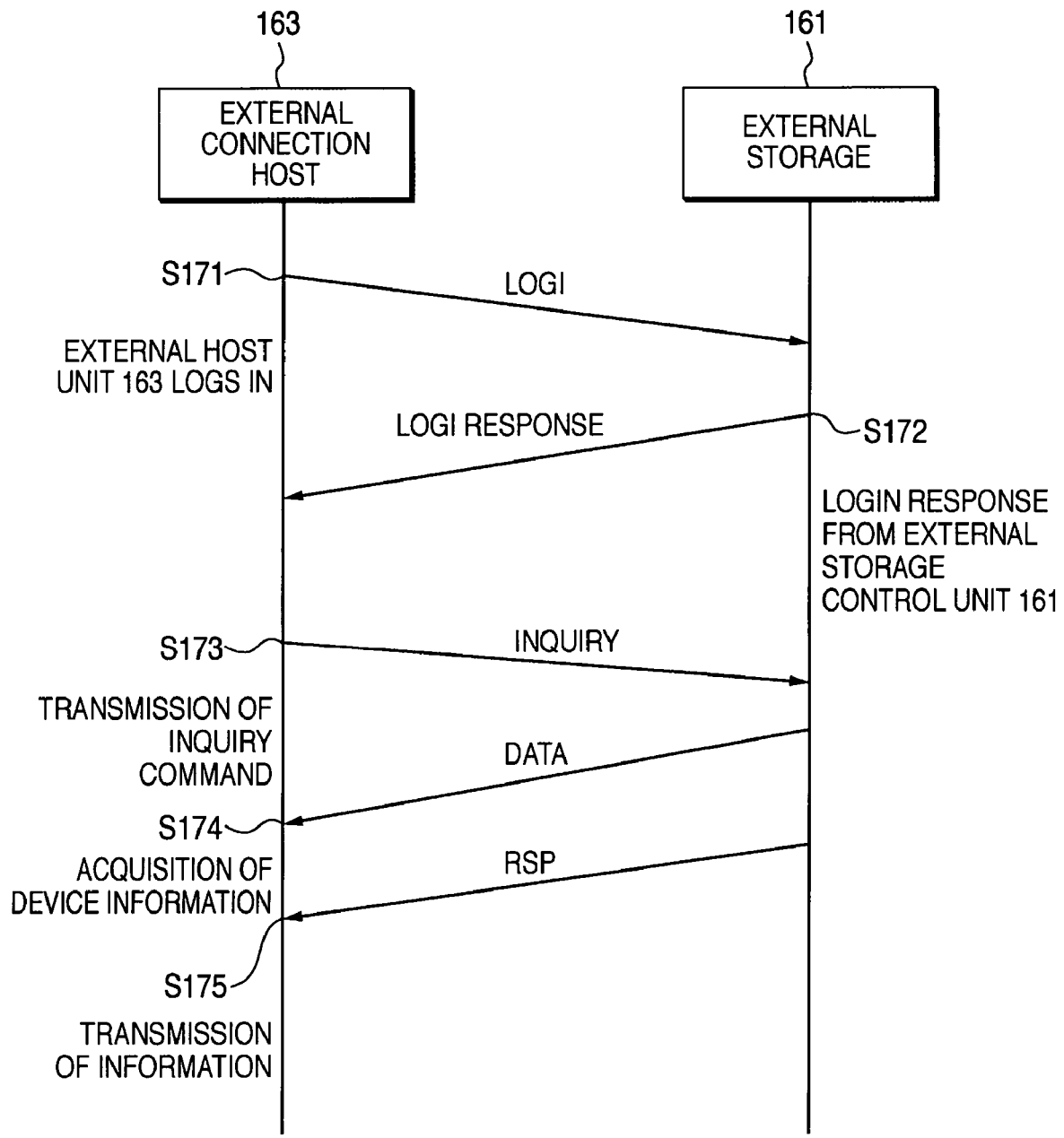
FIG. 14 is a flowchart showing the process flow in an external host and an external storage control unit according to the third embodiment of the present invention, specifically when requests and responses are made therebetween with respect to inquiry information.

FIG. 14 is a flowchart showing the process flow in the external host unit 163 and the external storage control unit 161 according to the third embodiment of the present invention, specifically when requests and responses are made therebetween for inquiry information.

In FIG. 14, the external host unit 163 logs in the external storage control unit 161 via a channel adaptor (not shown) of the external storage control unit 161 (step S171). Thereafter, by the external storage control unit 161 making a response to the login, login is completed (step S172). The external host unit 163 then transmits an inquiry command exemplarily approved by SCSI to the external storage control unit 161 to ask for details of the storage devices of the external storage unit 161 (step S173).

Here, the inquiry command is used to define the inquiring device by type and configuration, and thereby rendering the (storage) hierarchy of the inquiring device easy to grasp its physical configuration. With such an inquiry command, the external host unit 163 can acquire, from the external storage control unit 161, device information with which alternate path is acknowledgeable, such as unit name, device type, manufacturing number (product ID), LDEV number, various version information, and vendor ID (step S174). The external storage control unit 161 responsively forwards thus inquired information to the external host unit 163, sending back a response as such (step S175). After this process, a series of processing operation is through.

Figure 15:
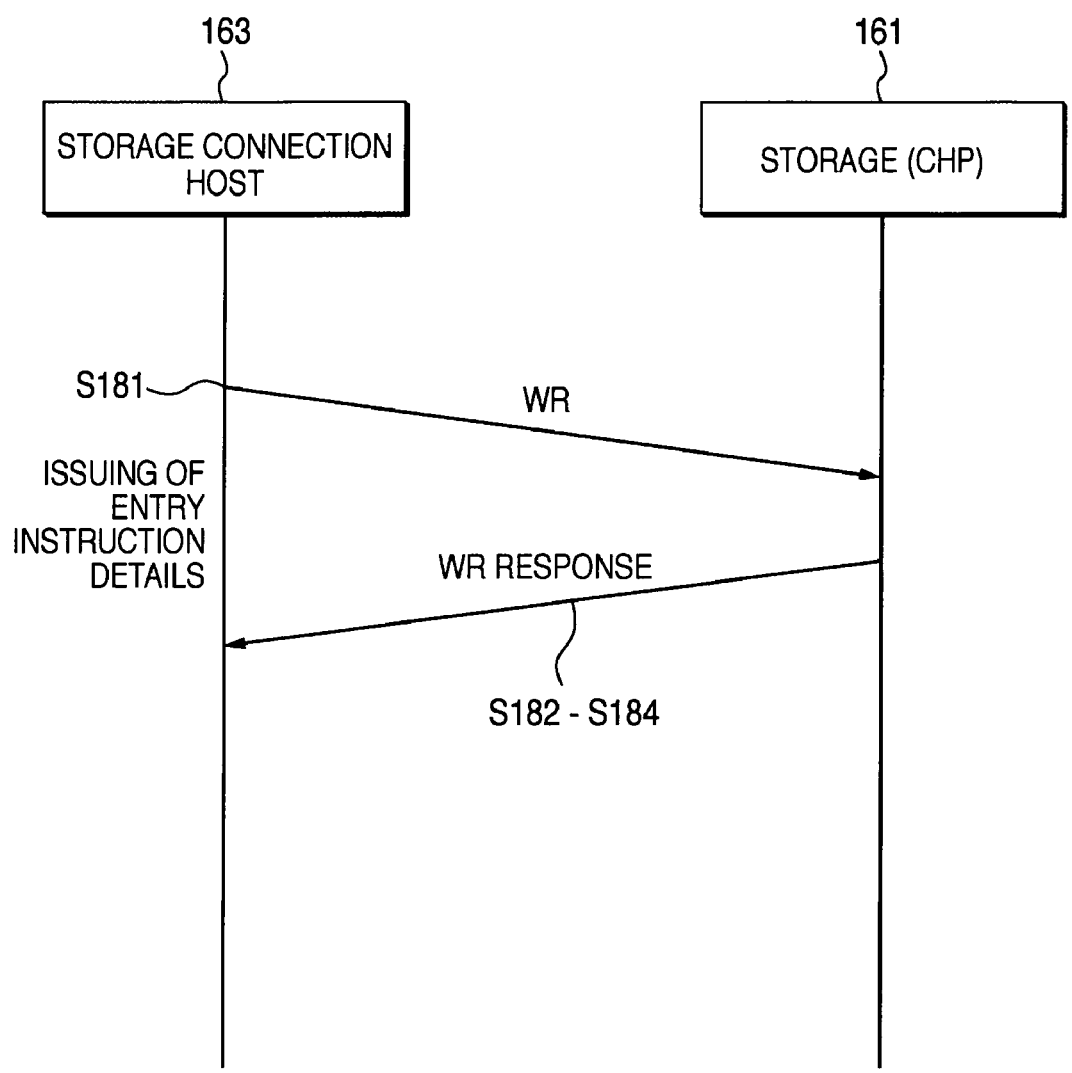
FIG. 15 is a flowchart showing the process flow in an external host unit and an external storage control unit according to a fourth embodiment of the present invention, specifically when the external host unit forwards inquiry information received from the external storage control unit to an application program in an internal host unit.

FIG. 15 is a flowchart showing the process flow in the external host unit 163 and the external storage control unit 161 according to a fourth embodiment of the present invention, specifically when the external host unit 163 forwards the inquiry information received from the external storage control unit 161 to the application program (11) of the host unit 10 (internal host unit). Here, the process flow of FIG. 15 indicates the processing operation of the various function blocks of FIG. 10, predicated on the system structure of FIGS. 12 and 13.

In FIG. 15, the external host unit 163 first issues a (SCSI) writing command toward the command device (not shown) of the external storage control unit 161 (step S181). Here, the writing command includes the instruction details (copy instruction details) for entry of inquiry information and others. The channel processor (CHP) (not shown) of the external storage control unit 161 then responsively accepts the command. The copy instruction details are captured directly to the local memory (not shown) to write the writing command to the command device (not shown) (step S182). Next, the channel processor (not shown) analyzes the copy instruction details, and if determined as the copy instruction details having no problem based on the analysis result, makes a reply telling that the writing response is normally made as a writing command completion report to the external host unit 163 (step S183). Following thereto, the external storage control unit 161 applies a process of retaining the inquiry information and others in the shared memory (SM) (not shown) (step S184). After this process, a series of processing operation is through.

Figure 16:
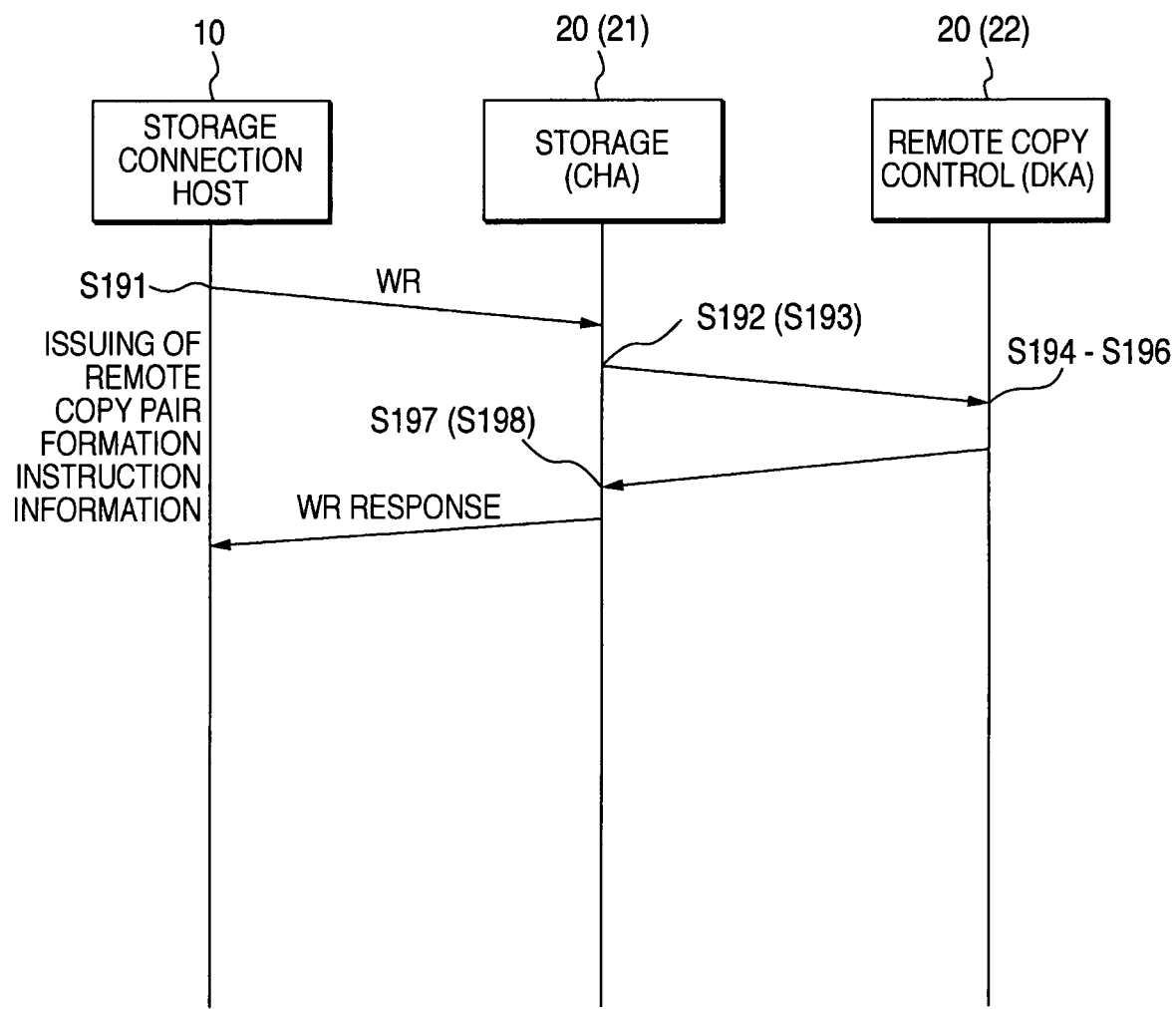
FIG. 16 is a flowchart showing the process flow in a first storage control unit according to a fifth embodiment of the present invention, specifically when going through pair formation between its storage region and that of an external storage control unit responding to an instruction from an application program of an internal host unit.

FIG. 16 is a flowchart showing the process flow in the first storage control unit 20 (of FIG. 1) according to a fifth embodiment of the present invention, specifically when going through pair formation between its storage region and that of the second storage control unit 40 being an external storage control unit responding to an instruction from the application program 11 (of FIG. 1) of the host unit 10. Here, the process flow of FIG. 16 indicates the processing operation of the function blocks shown in FIG. 10.

In FIG. 16, the host unit 10 first issues a (SCSI) writing command including information about remote copy pair formation instruction (remote copy pair formation instruction details) toward the command device (121) (shown in FIG. 10) of the first storage control unit 20 (step S191). The first storage control unit 20 accordingly receives this writing command. For writing of the writing command into the command device (121), the channel adaptor (CHA) (21) (shown in FIG. 1) captures the remote copy pair formation instruction details directly into the local memory (127) (shown in FIG. 10) (step S192). Then, the channel adaptor (21) analyzes the remote copy pair formation instruction details, and if determined as the instruction details having no problem based on the analysis result, instructs the disk adaptor (DKA) (22) (shown in FIG. 1) to form a remote copy pair (step S193).

After receiving this remote copy pair formation instruction, the disk adaptor (22) accordingly starts pair formation, and copy of initial data (inquiry data) (step S194). If determined that no problem occurs in the process of pair formation, the disk adaptor (22) makes a reply to the channel adaptor (21) telling that pair formation is normally completed (step S195). If determined that some problem occurs, the disk adaptor (22) makes a reply to the channel adaptor (21) telling that pair formation is erroneous (step S196).

When the reply coming from the disk adaptor (22) tells that pair formation is normally through, the channel adaptor (21) sends a completion status report of the remote copy pair formation instruction to the host unit 10, telling that remote copy pair formation has been normally through (step S197). Note here that, if such instruction details from the host unit 10 show any contradiction, or if an error report comes from the disk adaptor (22), the channel adaptor (21) forwards the response telling that some errors occur in the remote copy formation back to the host unit 10 (step S198).

As shown in FIG. 17A, in accordance with the copy instruction received from (the application program 11 of) the host unit 10, the first storage control unit 20 executes remote copy from a storage device 209 of a remote-copy-incapable external storage control unit 201 to its own virtual device 207. Alternatively, together with remote copy, the first storage control unit 20 may execute remote copy from its own storage device 205 to the virtual device 207. While the first storage control unit 20 is executing copy as such, if the external storage control unit 201 is accessed by the directly-connected external host unit 203, the external storage control unit 201 is not able to reject the access from the external host unit 203. As a result, the copy details may be problematically destructed.

In consideration thereof, in a sixth embodiment of the present invention, as shown in FIG. 17B, immediately before starting remote copy from the external storage control unit 201 in accordance with the copy instruction issued by (the application program 11 of) the host unit 10, the first storage control unit 20 issues a reserve command to the external storage control unit 201. Thereby, the above problem is successfully prevented.

By referring to FIG. 17B, the sixth embodiment of the present invention is described in more detail. In response to the copy instruction from the application program 11 (of the host unit 10), immediately before starting copy and remote copy, the channel processor (CHP) (125) in the first storage control unit 20 issues an SCSI reserve command to the storage device 209 in the external storage control unit 201 designated by the ID in the command. By accepting such a reserve command, the storage device 209 becomes able to shut out the access from the external host unit 203 at the SCSI command level.

After completing copy from the storage device 205 to the virtual device 207, and remote copy from the storage device 209 (of the external storage control unit 201) to the virtual device 207, the external host unit 203 can access the external storage control unit 201 again if the channel processor (CHP) (125) cancels the reserve command.

As described in the foregoing, according to the present embodiment, by merely issuing a copy instruction to the first storage control unit 20, the application program 11 (of the host unit 10) can shut out access from the external host unit 203 to the external storage control unit 201 via the first storage control unit 20. Thereby, copy destruction is favorably prevented.

Figure 18A:
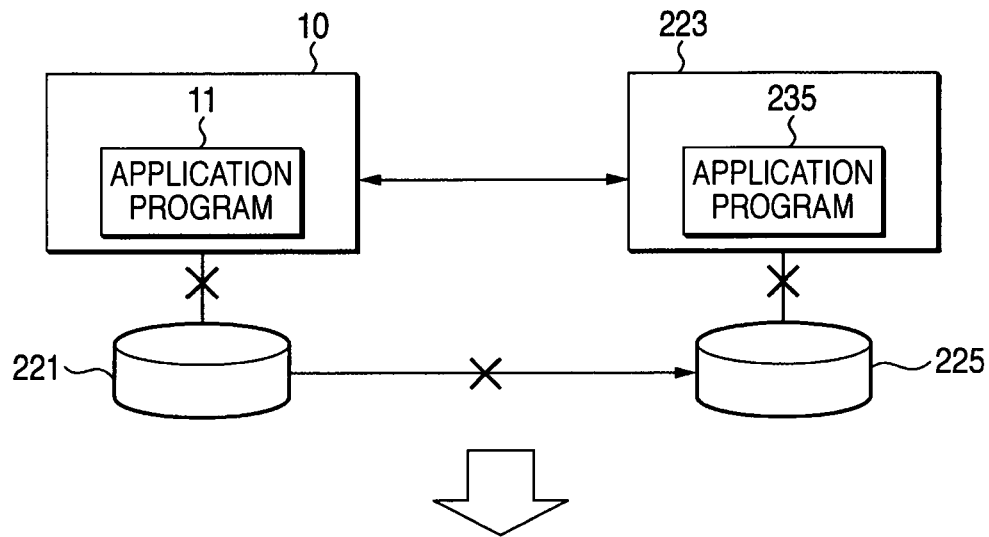
FIGS. 18A and 18B are both a block diagram showing the system structure of a storage control unit system for realizing a seventh embodiment of the present invention.

Here, as shown in FIG. 18A, there may be a case where a storage control unit 221 may not be structurally ready for accepting a command of remote copy instruction from the host unit 10, or an external storage control unit 225 may not be structurally ready for accepting a command of remote copy instruction from an external host unit 223 communicable with the host unit 10. If these are the cases, no remote copy is available for neither the host unit 10 nor the external host unit 223 from the storage control unit 221 to the external storage control unit 225.

Figure 18B:
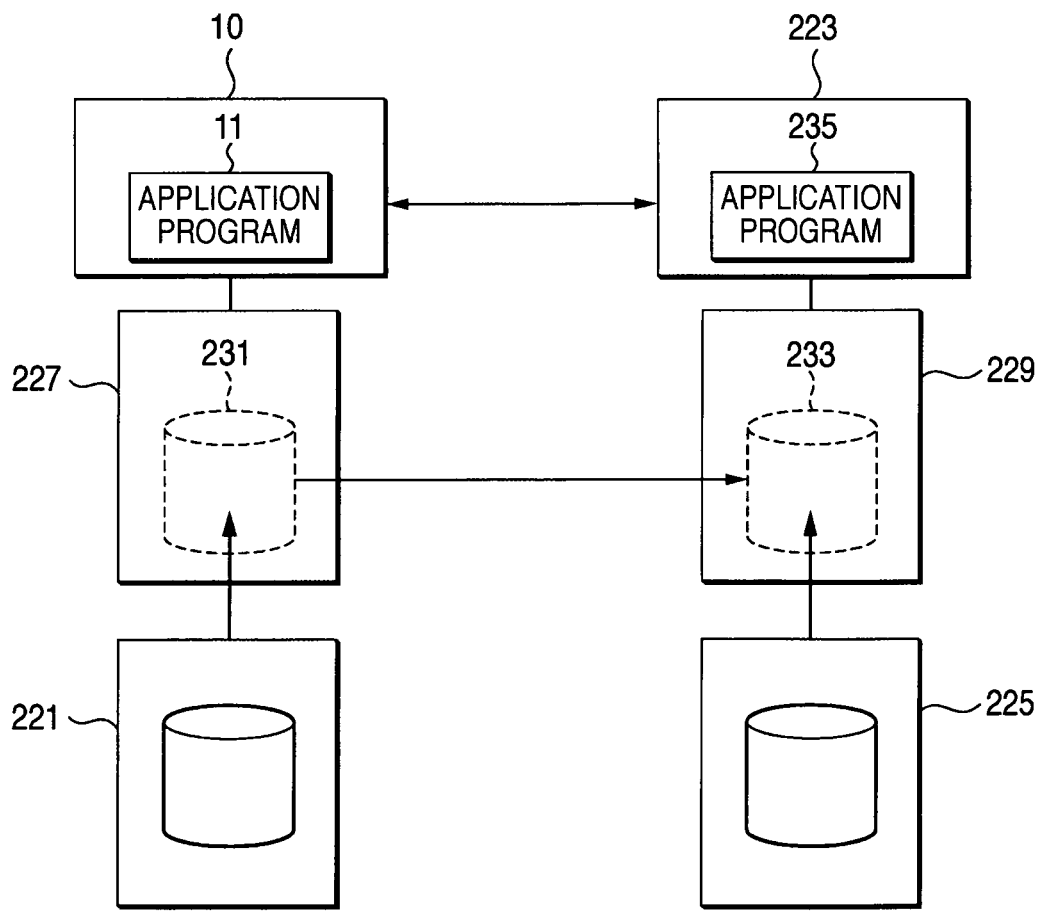

In consideration thereof, in a seventh embodiment of the present invention, as shown in FIG. 18B, a storage control unit 227 similar in structure to the first storage control unit 20 described by referring to FIG. 1 and others is provided on the host unit 10 side as an internal storage control unit. On the external host unit 223 side, a storage control unit 229 similar in structure to the second storage control unit 40 described by referring to FIG. 1 and others is provided as an external storage control unit. Then, via the internal storage control unit 227 and the external storage control unit 229, the external host unit 223 is caused to acknowledge as if remote copy were executed to (data in) the (internal) storage control unit 221 to the external storage control unit 225 side.

By referring to FIG. 18B, the seventh embodiment of the present invention is described in more detail. In the internal storage control unit 227, (data of) the remote-copy-incapable internal storage control unit 221 is copied into a virtual device 231 virtualized among a plurality of storage devices. Also in the external storage control unit 229, (data of) the remote-copy-incapable external storage control unit 225 is copied into a virtual device 233 virtualized among a plurality of storage devices.

In such a manner, with respect to the virtual device 233 of the external storage control unit 229 to which (the data of) the external storage control unit 225 is copied, (the data from the internal storage control unit 221 stored in) the internal storage control unit 227 is remotely copied.

An application program 235 of the external host unit 223 acknowledges the virtual device 233 of the external storage control unit 229 as a storage device thereof. Therefore, the data copied to the virtual device 233 becomes available for the external host unit 223.

As is evident from the above, according to the present embodiment, the remote-copy-incapable storage control units 221 and 225 becomes capable of executing remote copy. What is more, the application program 11 (of the host unit 10) becomes capable of remote copy control for supporting remote copy control.

As such, the preferred embodiments of the present invention are described. These are exemplified for illustrating the present invention, but not for restricting the scope of the present invention only to these embodiments. The present invention can be embodied by any other various forms.

What is claimed is:

1. A disk array apparatus directly connected to a host computer and another disk array apparatus incapable of establishing a direct connection with the host computer in which data coming from the host computer is stored in a storage region as a result of addition of a storage region of the another disk array apparatus to a storage region of the disk array apparatus, the disk array apparatus comprising:
   a logical unit formation section for forming a plurality of logical units from the storage region of the addition result to be accessed by the host computer;
   a data writing section for writing, to each of the logical units, data coming from the host computer and the another disk array apparatus;
   a first check section for checking a validity of a reading request coming from the host computer for reading the data stored in the disk array and the another disk array apparatus;
   a data transfer section for, when the first check section determines that the data reading request is valid, transferring the data stored in each of the logical units to the host computer based on the data reading request;
   a second check section for checking a validity of an instruction coming from the host computer for forming a pair between, out of the plurality of logical units, the logical unit formed from the storage region of the disk array apparatus and the logical unit formed from the storage region of the another disk array apparatus;
   a pair formation section for forming the pair when the second check section determines that the instruction from the host computer is valid as a result of instruction check; and
   a copy section for, when the logical unit formed from the storage region of the disk array apparatus is accessed by the host computer for writing, copying writing data to the other logical unit forming the pair with the logical unit, wherein
   utilizing an interrelation between information about the plurality of logical units and information about the storage region as the addition result, the copy section copies the writing data to any actual storage region of the another disk array apparatus.

2. The disk array apparatus according to claim 1, wherein the data reading request includes a command for the disk array apparatus to acquired the data stored in the another disk array apparatus, and based on the command, another command for the disk array apparatus to transfer the acquired data to the host computer.

3. The disk array apparatus according to claim 1, wherein the first check section checks the validity of both the command for the data acquisition and the command for the data transfer to the host computer.

4. The disk array apparatus according to claim 3, wherein when the first check section determines that neither or either of the commands is valid as a result of command check, a report indicative of error is made to the host computer.

5. The disk array apparatus according to claim 1, further comprising
   a data creation section for, when the first check section determines that the command for the data acquisition is valid, creating data based on the command for transfer to the host computer.

6. The disk array apparatus according to claim 1, wherein the data transfer section transfer the data created by the data creation section after checking that the host computer is a sender of the data reading request.

7. The disk array apparatus according to claim 1, wherein the data writing section writes the data transferred from the another disk array apparatus to the disk array apparatus through mapping to the storage region of the disk array apparatus being a virtual device connected to the logical units.

8. A disk array apparatus directly connected to a host computer and another disk array apparatus incapable of establishing a direct connection with the host computer in which data coming from the host computer is stored in a storage region as a result of addition of a storage region of the another disk array apparatus to a storage region of the disk array apparatus, the disk array apparatus comprising:
 a logical unit formation section for forming a plurality of logical units from the storage region of the addition result to be accessed by the host computer;
 a mapping table retention section at least including identifying information for a virtual device derived by virtualizing the storage region of the disk array apparatus, and retaining a mapping table showing an interrelation between the virtual device and the storage region of the another disk array apparatus mapped to the virtual device;
 a search section for, when a data reading request including at least the identifying information for the virtual device comes from the host computer, searching the mapping table for a target virtual device based on the identifying information;
 a data transfer section for reading data from the virtual device found by the search section for transfer to the host computer;
 a check section for checking a validity of an instruction coming from the host computer for forming a pair between, out of the plurality of logical units, the logical unit formed from the storage region of the disk array apparatus and the logical unit formed from the storage region of the another disk array apparatus;
 a pair formation section for forming the pair when the check section determines that the instruction from the host computer is valid as a result of instruction check; and
 a copy section for, when the logical unit formed from the storage region of the disk array apparatus is accessed by the host computer for writing, copying writing data to the other logical unit forming the pair with the logical unit, wherein
 utilizing an interrelation between information about the plurality of logical units and information about the storage region as the addition result, the copy section copies the writing data to any actual storage region of the another disk array apparatus.

9. The disk array apparatus according to claim 8, wherein
 to the virtual device, data of another storage region of the disk array apparatus is also copied, and
 the data reading request from the host computer includes identifying information for the another storage region.

10. The disk array apparatus according to claim 8, wherein
 the data transferred by the data transfer section from the disk array apparatus to the host computer is further transferred from the host computer to another host computer that is never directly connected to the disk array apparatus.

11. A disk array apparatus directly connected to a host computer and another disk array apparatus incapable of establishing a direct connection with the host computer in which data coming from the host computer is stored in a storage region as a result of addition of a storage region of the another disk array apparatus to a storage region of the disk array apparatus, the disk array apparatus comprising:
 a logical unit formation section for forming a plurality of logical units from the storage region of the addition result to be accessed by the host computer;
 a data writing section for writing, to each of the logical units, data coming from the host computer and the another disk array apparatus;
 a check section for checking validity of an instruction coming from the host computer for forming a pair between, out of the plurality of logical units, the logical unit formed from the storage region of the disk array apparatus and the logical unit formed from the storage region of the another disk array apparatus;
 a pair formation section for forming the pair when the check section determines that the instruction from the host computer is valid as a result of instruction check; and
 a copy section for, when the logical unit formed from the storage region of the disk array apparatus is accessed by the host computer for writing, copying writing data to the other logical unit forming the pair with the logical unit, wherein
 utilizing an interrelation between the information about the plurality of logical units and information about the storage region as the addition result, the copy section copies the writing data to any actual storage region of the another disk array apparatus.

12. The disk array apparatus according to claim 11, wherein
 when the check section determines that the pair formation instruction is not valid as a result of instruction check, a report indicative of error is made to the host computer.

13. The disk array apparatus according to claim 11, wherein
 when the pair formation section determines that a problem occurs in a process of the pair formation, a report indicative of error is made to the host computer.

14. A disk array apparatus directly connected to a first host computer and another disk array apparatus connected to a second host computer in which data coming from the first host computer is stored in a storage region as a result of addition of a storage region of the another disk array apparatus, the disk array apparatus comprising:
 a logical unit formation section for forming a plurality of logical units from the storage region of the addition result to be accessed by the host computer;
 a data writing section for writing, to each of the logical units, data coming from the first host computer and the another disk array apparatus;
 a check section for checking a validity of an instruction coming from the first host computer for forming a pair between, out of the plurality of logical units, the logical unit formed from the storage region of the disk array apparatus and the logical unit formed from the storage region of the another disk array apparatus;
 a pair formation section for forming the pair when the check section determines that the instruction from the first host computer is valid as a result of instruction check;
 a copy section for, when the logical unit is formed from the storage region of the disk array apparatus is accessed by the first host computer for writing, copying written data to the other logical unit forming the pair with the logical unit; and
 a prohibition section for, when a reading request comes from the second host computer for the data stored in the disk array apparatus and the another disk array apparatus, prohibiting the second host computer to make an access to the another disk array apparatus until a process ends after started responding to the data reading request, wherein utilizing an interrelation between information about the plurality of logical units and information about the storage region as the addition result, the copy section copies the writing data to any actual storage region of the another disk array apparatus.

15. The disk array apparatus according to claim 14, wherein
the access prohibition is issuing of a reserve command by the prohibition section to the another disk array apparatus to protect the data of the another disk array apparatus from the access by the second host computer thereto.

16. The disk array apparatus according to claim 14, wherein
to the virtual device, data of the another storage region of the disk array apparatus is also copied.

17. A control method of a disk array apparatus directly connected to a host computer and another disk array apparatus incapable of establishing a direct connection with the host computer in which data coming from the computer is stored in a storage region as a result of addition of a storage region of the another disk array apparatus to a storage region of he disk array apparatus, the control method comprising:

a logical unit formation step of forming a plurality of logical units from the storage region of the addition result to be accessed by the host computer;

a data writing step of writing, to each of the logical units, data coming from the host computer and the another disk array apparatus;

a first check step of checking a validity of a reading request coming from the host computer for reading the data stored in the disk array apparatus and the another disk array apparatus;

a data transfer step of, when the first check step determines that the data reading request is valid, transferring the data stored in each of the logical units to the host computer based on the data reading request;

a second check step of checking a validity of an instruction coming from the host computer for forming a pair between, out of the plurality of logical units, the logical unit formed from the storage region of the disk array apparatus and the logical unit formed from the storage region of the another disk array apparatus;

a pair formation step of forming the pair when the second check step determines that the instruction from the host computer is valid as a result of instruction check; and a writing data copy step of, when the logical unit formed from the storage region of the disk array is accessed by the host computer for writing, copying writing data to the other logical unit forming the pair with the logical unit, wherein utilizing an interrelation between information about the plurality of logical units and information about the storage region as the addition result, the writing data copy step copies the writing data to any actual storage region of the another disk array apparatus.

18. A control method of a disk array apparatus directly connected to a host computer and another disk array apparatus incapable of establishing a direct connection with the host computer in which data coming from the host computer is stored in a storage region as a result of addition of a storage region of the another disk array apparatus to a storage region of the disk array apparatus, the control method comprising:

a logical unit formation step of forming a plurality of logical units from the storage region of the addition result to be accessed by the host computer;

a mapping table retention step at least including identifying information for a virtual device derived by virtualizing the storage region of the disk array apparatus, and retaining a mapping table showing an interrelation between the virtual device and the storage region of the another disk array apparatus mapped to the virtual device;

a search step of, when a data reading request including at least the identifying information for the virtual device comes from the host computer, searching mapping table for a target virtual device based on the identifying information;

a data transfer step of reading data from the virtual device found by the search step for transfer to the host computer;

a check step of checking a validity of an instruction coming from the host computer for forming a pair between, out of the plurality of logical units, the logical unit formed from the storage region of the disk array apparatus and the logical unit formed from the storage region of the another disk array apparatus;

a pair formation step of forming the pair when the check step determines that the instruction from the host computer is valid as a result of instruction check; and a writing data copy step of, when the logical unit formed from the storage region of the disk array apparatus is accessed by the host computer for writing, copying writing data to the other logical unit forming the pair with the logical unit, wherein utilizing an interrelation between information about the plurality of logical units and information about the storage region as the addition result, the writing data copy step copies the writing data to any actual storage region of the another disk array apparatus.

19. A control method of a disk array apparatus directly connected to a host computer and another disk array apparatus incapable of establishing a direct connection with the host computer in which data coming from the host computer is stored in a storage region as a result of addition of a storage region of the another disk array apparatus to a storage region of the disk array apparatus, the control method comprising:

a logical unit formation step of forming a plurality of logical units from the storage region of the addition result to be accessed by the host computer;

a data writing step of writing, to each of the logical units, data coming from the host computer and the another disk array apparatus;

a check step of checking a validity of an instruction coming from the host computer for forming a pair between, out of the plurality of logical units, the logical unit formed from the storage region of the disk array apparatus and the logical unit formed from the storage region of the another disk array apparatus;

a pair formation step of forming the pair when the check step determines that the instruction from the host computer is valid as a result of instruction check; and a writing data copy step of, when the logical unit formed from the storage region of the disk array apparatus is accessed by the host computer for writing, copying writing data to the other logical unit forming the pair with the logical unit, wherein utilizing an interrelation between information about the plurality of logical units and information about the storage region as the addition result, the writing data copy step copies the writing data to any actual storage region of the another disk array apparatus.

20. A control method of a disk array apparatus directly connected to a first host computer and another disk array apparatus connected to a second host computer in which data coming from the first host computer is stored in a storage region as a result of addition of a storage region of the another disk array apparatus to a storage region of the disk array apparatus, the control method comprising:

a logical unit formation step of forming a plurality of logical units from the storage region of the addition result to be accessed by the host computer;

a data writing step of writing, to each of the logical units, data coming from the first host computer and the another disk array apparatus;

a check step of checking a validity of an instruction coming from the first host computer for forming a pair between, out of the plurality of logical units, the logical unit formed from the storage region of the disk array apparatus and the logical unit formed from the storage region of the another disk array apparatus;

a pair formation step of forming the pair when the check step determines that the instruction from the first host computer is valid as a result of the instruction check;

a writing data copy step of, when the logical unit formed from the storage region of the disk array apparatus is accessed by the first host computer for writing, copying writing data to the other logical unit forming the pair with the logical unit; and a prohibition step of, when a reading request comes from the second host computer for the data stored in the disk array apparatus and the another disk array apparatus, prohibiting the second host computer to make an access to the another disk array apparatus until a process ends after started responding to the data reading request, wherein utilizing an interrelation between information about the plurality of logical units and information about the storage region as the addition result, the writing data copy step copies the writing data to any actual storage region of the another disk array apparatus.

* * * * *